United States Patent
Cao et al.

(10) Patent No.: US 9,935,794 B1
(45) Date of Patent: Apr. 3, 2018

(54) CARRIER FREQUENCY OFFSET ESTIMATION

(71) Applicant: Marvell International Ltd., Hamilton (BM)

(72) Inventors: Rui Cao, Fremont, CA (US); Xiayu Zheng, San Jose, CA (US); Hongyuan Zhang, Fremont, CA (US); Hui-Ling Lou, Sunnyvale, CA (US); Liwen Chu, San Ramon, CA (US); Yakun Sun, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 329 days.

(21) Appl. No.: 14/667,448

(22) Filed: Mar. 24, 2015

Related U.S. Application Data

(60) Provisional application No. 62/054,686, filed on Sep. 24, 2014, provisional application No. 62/030,512,
(Continued)

(51) Int. Cl.
*H04W 52/54* (2009.01)
*H04L 27/26* (2006.01)
(Continued)

(52) U.S. Cl.
CPC ....... *H04L 25/0226* (2013.01); *H04B 7/0413* (2013.01); *H04W 56/0035* (2013.01)

(58) Field of Classification Search
CPC ....... H04L 12/28; H04L 27/261; H04L 29/10; H04L 5/0048; H04L 5/0053; H04W 28/18;
(Continued)

(56) References Cited

U.S. PATENT DOCUMENTS 7,599,332 B2  10/2009  Zelst et al.
7,742,390 B2   6/2010  Mujtaba
(Continued)

FOREIGN PATENT DOCUMENTS

WO   WO-2005039105 A1   4/2005

OTHER PUBLICATIONS

U.S. Appl. No. 15/334,550, Cao et al., "Carrier Frequency Offset Estimation," filed Oct. 26, 2016.
(Continued)

*Primary Examiner* — Awet Haile

(57) ABSTRACT

A method for use in a communication network is described. A plurality of data frames, transmitted simultaneously from respective ones of a plurality of second communication devices, are received at a first communication device via a multiple input, multiple output (MIMO) communication channel. A common carrier frequency offset (CFO) that is common to the data frames is estimated based on a legacy portion of a physical layer (PHY) preamble of the data frames. Each data frame is compensated based on the common CFO. Respective device-specific CFOs are estimated for channel estimation of the MIMO communication channel based on pilot tones of respective non-legacy training field portions of the data frames. The pilot tones have a non-overlapping allocation to the plurality of second communication devices and each device-specific CFO is specific to the corresponding second communication device. The respective non-legacy training field portions are compensated based on the corresponding device-specific CFO.

27 Claims, 19 Drawing Sheets

Related U.S. Application Data filed on Jul. 29, 2014, provisional application No. 61/969,564, filed on Mar. 24, 2014.

(51) Int. Cl.
*H04L 25/02* (2006.01)
*H04B 7/0413* (2017.01)
*H04W 56/00* (2009.01)

(58) Field of Classification Search
CPC ......... H04W 56/0005; H04W 72/1289; H04W 84/12
See application file for complete search history.

(56) References Cited

U.S. PATENT DOCUMENTS

| | | | |
|---|---|---|---|
| 8,144,647 B2 | 3/2012 | Nabar et al. | |
| 8,149,811 B2 | 4/2012 | Nabar et al. | |
| 8,155,138 B2 | 4/2012 | van Nee | |
| 8,270,909 B2 | 9/2012 | Zhang et al. | |
| 8,289,869 B2 | 10/2012 | Sawai | |
| 8,472,383 B1 | 6/2013 | Banerjea et al. | |
| 8,526,351 B2 | 9/2013 | Fischer et al. | |
| 8,571,010 B1 | 10/2013 | Zhang et al. | |
| 8,599,803 B1 | 12/2013 | Zhang et al. | |
| 8,619,907 B2 | 12/2013 | Mujtaba et al. | |
| 8,660,497 B1 | 2/2014 | Zhang et al. | |
| 8,724,546 B2 | 5/2014 | Zhang et al. | |
| 8,724,720 B2 | 5/2014 | Srinivasa et al. | |
| 8,867,675 B1 | 10/2014 | Zhang | |
| 8,873,525 B2 | 10/2014 | Liu et al. | |
| 8,885,620 B2 | 11/2014 | Liu et al. | |
| 8,886,755 B1 | 11/2014 | Liu et al. | |
| 8,923,217 B2 | 12/2014 | Liu et al. | |
| 8,964,789 B1 | 2/2015 | Lee et al. | |
| 9,232,493 B2 | 1/2016 | Zhang et al. | |
| 2005/0276347 A1 | 12/2005 | Mujtaba et al. | |
| 2008/0095110 A1 | 4/2008 | Montojo et al. | |
| 2009/0129298 A1 | 5/2009 | Luo et al. | |
| 2009/0196163 A1 | 8/2009 | Du | |
| 2009/0207765 A1 | 8/2009 | Yamaura | |
| 2010/0046656 A1 | 2/2010 | van Nee et al. | |
| 2010/0284393 A1 | 11/2010 | Abraham et al. | |
| 2011/0002219 A1 | 1/2011 | Kim et al. | |
| 2011/0096796 A1 | 4/2011 | Zhang et al. | |
| 2011/0194655 A1* | 8/2011 | Sampath | H04L 27/0014 375/341 |
| 2011/0310827 A1 | 12/2011 | Srinivasa et al. | |
| 2014/0153614 A1* | 6/2014 | Parker | H04L 27/261 375/133 |
| 2014/0307649 A1* | 10/2014 | Vermani | H04L 5/0044 370/329 |
| 2015/0131580 A1* | 5/2015 | Liu | H04B 7/0452 370/329 |
| 2016/0156497 A1* | 6/2016 | Yang | H04B 7/0452 370/328 |
| 2016/0249366 A1* | 8/2016 | Seok | H04B 7/024 |

OTHER PUBLICATIONS

Van Nee, et al. "The 802.11n MIMO-OFDM Standard for Wireless LAN and Beyond," Wireless Personal Communications, vol. 37, pp. 445-453 (Jun. 2006).

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, *The Institute of Electrical and Electronics Engineers, Inc.*, pp. 1-2695 (Mar. 29, 2012).

Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).

Stacey et al., "Specification Framework for TGac," document No. IEEE 802.11-09/0992r20, Institute for Electrical and Electronics Engineers, pp. 1-49, (Jan. 18, 2011).

IEEE Std 802.11ac/D2.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-359 (Jan. 2012).

IEEE Std 802.11ac/D2.1 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-363 (Mar. 2012).

IEEE Std 802.11ac/D3.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-385 (Jun. 2012).

IEEE Std 802.11ac/D4.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-408 (Oct. 2012).

IEEE Std 802.11ac/D5.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-440 (Jan. 2013).

IEEE Std 802.11ac/D6.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-446 (Jul. 2013).

IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-456 (Sep. 2013).

Perahia, et al., "Gigabit Wireless LANs: an overview of IEEE 802.11ac and 80211ad," ACM SIGMOBILE Mobile Computing and Communications Review, vol. 15, No. 3, pp. 23-33 (Jul. 2011).

* cited by examiner

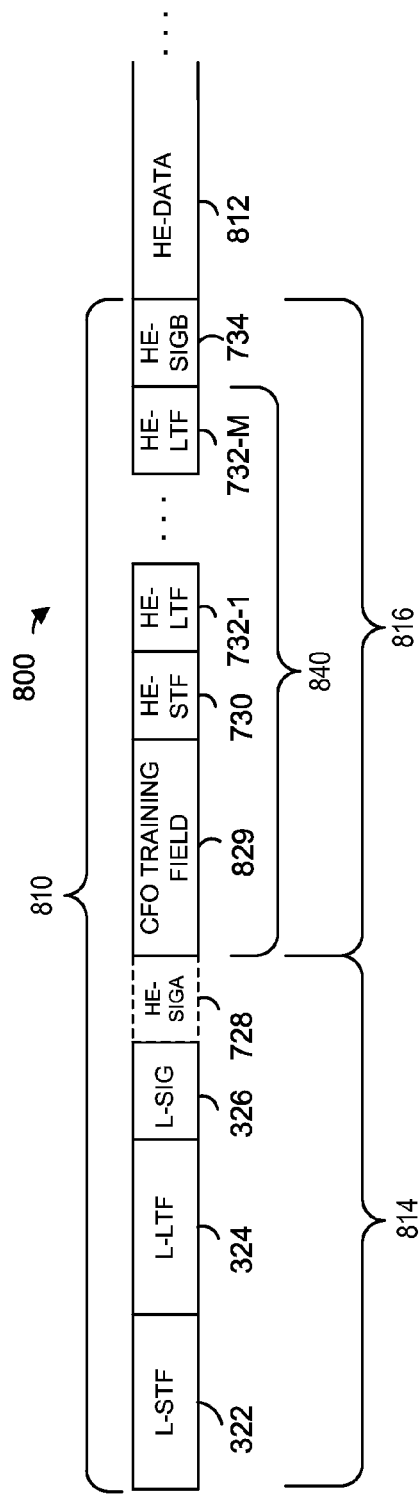
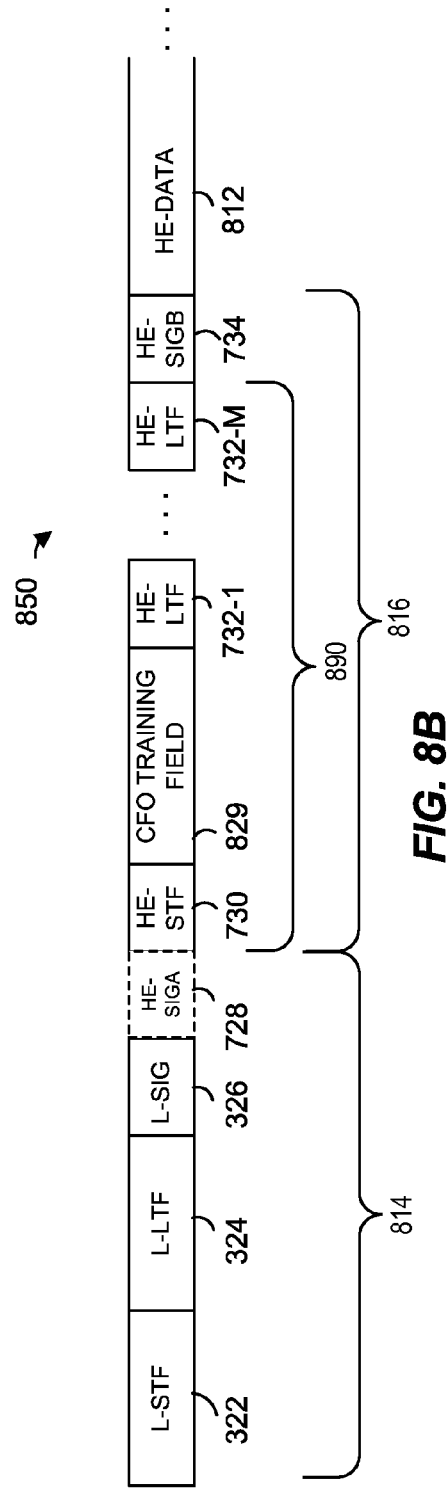
FIG. 8A
FIG. 8B

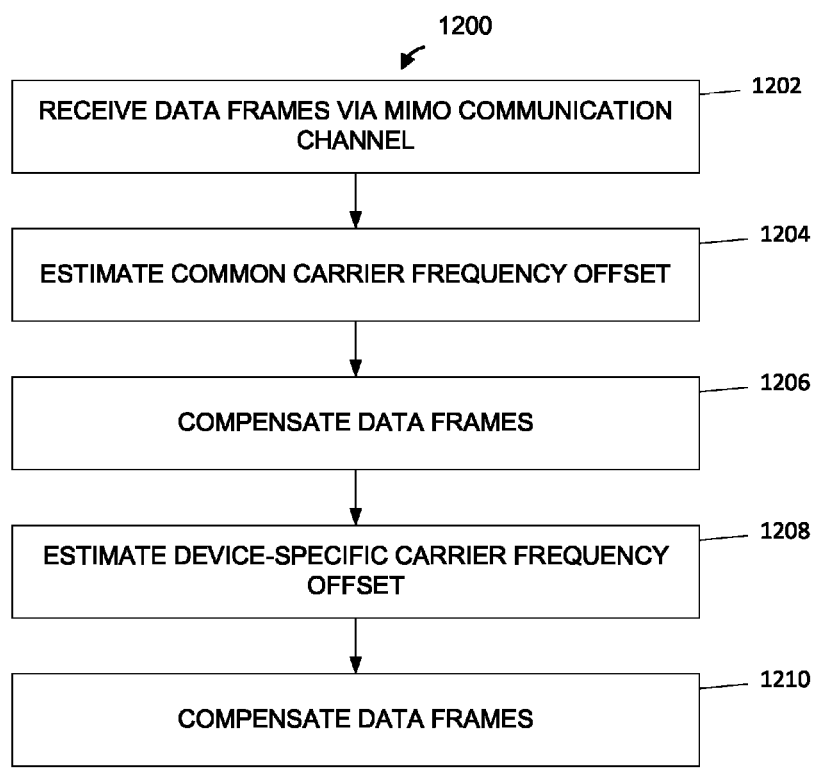

CARRIER FREQUENCY OFFSET ESTIMATION

CROSS-REFERENCES TO RELATED APPLICATIONS

This disclosure claims the benefit of U.S. Provisional Patent Application No. 61/969,564, entitled "Carrier Frequency Offset Estimation and Compensation for Uplink Multi-User MIMO in WLAN" and filed on Mar. 24, 2014, U.S. Provisional Patent Application No. 62/030,512, entitled "Carrier Frequency Offset Estimation and Compensation for Uplink Multi-User MIMO in WLAN" and filed on Jul. 29, 2014, and U.S. Provisional Patent Application No. 62/054,686, entitled "Carrier Frequency Offset Estimation and Compensation for Uplink Multi-User MIMO in WLAN" and filed on Sep. 24, 2014, the disclosures of each of which are incorporated herein by reference in their entireties.

FIELD OF THE DISCLOSURE

The present disclosure relates generally to communication networks and, more particularly, to wireless local area networks that utilize multiple input, multiple output (MIMO) techniques.

BACKGROUND

When operating in an infrastructure mode, wireless local area networks (WLANs) typically include an access point (AP) and one or more client stations. WLANs have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughputs, such as throughputs in the tens of Gbps range.

WLANs typically operate in either a unicast mode or a multicast mode. In the unicast mode, an access point (AP) transmits information to one client station at a time. In the multicast mode, the same information is simultaneously transmitted to a group of client stations. In the uplink direction, a client station typically contends for access to the medium or transmits data to the AP within a time period specifically allocated to the client station.

SUMMARY

In an embodiment, a method for use in a communication network includes receiving, at a first communication device, a plurality of data frames via a multiple input, multiple output (MIMO) communication channel. The plurality of data frames are transmitted simultaneously from respective ones of a plurality of second communication devices. The method also includes estimating, by the first communication device, a common carrier frequency offset (CFO) that is common to each of the plurality of data frames based on a legacy portion of a physical layer (PHY) preamble of each of the plurality of data frames. The method includes compensating, by the first communication device, each of the plurality of data frames based on the common CFO. The method includes estimating, by the first communication device, respective device-specific CFOs for channel estimation of the MIMO communication channel based on pilot tones of respective non-legacy training field portions of the plurality of data frames. The pilot tones have a non-overlapping allocation to the plurality of second communication devices and each device-specific CFO is specific to the corresponding second communication device of the plurality of second communication devices. The method also includes compensating, by the first communication device, the respective non-legacy training field portions based on the corresponding device-specific CFO.

In another embodiment, a method for transmitting a data frame in a communication network includes receiving, at a first communication device and from a second communication device, a synchronization frame having an allocation indicator that indicates a non-overlapping allocation of pilot tones. The method also includes generating, by the first communication device, a first data frame that comprises a plurality of OFDM symbols of a non-legacy training field portion, the plurality of OFDM symbols including only pilot tones corresponding to the non-overlapping allocation of pilot tones. The method includes transmitting, by the first communication device in response to the synchronization frame and via a MIMO communication channel, the first data frame to the second communication device simultaneously with a transmission of a second data frame by a third communication device via the MIMO communication channel. Corresponding OFDM symbols of respective non-legacy training field portions of the first data frame and the second data frame include non-overlapping pilot tones according to the non-overlapping allocation.

In an embodiment, a method for use in a communication network includes receiving, at a first communication device, a plurality of data frames via a multiple input, multiple output (MIMO) communication channel. The plurality of data frames are transmitted simultaneously from respective ones of a plurality of second communication devices, including receiving a respective non-legacy training field portion of a PHY preamble for each of the plurality of data frames. Each non-legacy training field portion has i) a reference field, ii) a short training field, and iii) at least one long training field. The method also includes estimating, by the first communication device, a common CFO that is common to each of the plurality of data frames based on a legacy portion of the PHY preamble of each of the plurality of data frames. The method includes compensating, by the first communication device, each of the plurality of data frames based on the common CFO. The method includes estimating, by the first communication device, respective device-specific CFOs for channel estimation of the MIMO communication channel based on pilot tones of the corresponding reference field after compensating each of the plurality of data frames. The pilot tones have a non-overlapping allocation to the plurality of second communication devices and each device-specific CFO is specific to the corresponding second communication device of the plurality of second communication devices. The method also includes compensating, by the first communication device, the plurality of data frames based on the corresponding device-specific CFO.

In another embodiment, a method for transmitting a data frame in a communication network includes receiving, at a first communication device and from a second communication device, a synchronization frame. The method also includes generating, by the first communication device, a first data frame. A non-legacy training field portion of a PHY preamble for the first data frame includes i) a reference field, ii) a short training field, and iii) at least one long training field. The method also includes transmitting, by the first communication device and via a MIMO communication channel in response to the synchronization frame, the first data frame to the second communication device simultaneously with a transmission of a second data frame by a third communication device via the MIMO communication channel.

In an embodiment, a method for use in a communication network includes receiving, at a first communication device, a plurality of data frames via a MIMO communication channel. The plurality of data frames are transmitted simultaneously from respective ones of a plurality of second communication devices. The method includes estimating, by the first communication device, a common CFO that is common to each of the plurality of data frames based on a legacy portion of the PHY preamble of each of the plurality of data frames. The method also includes compensating, by the first communication device, each of the plurality of data frames based on the common CFO. The method includes estimating, by the first communication device, respective first device-specific CFOs for channel estimation of the MIMO communication channel based on pilot tones of respective non-legacy training field portions of the plurality of data frames after compensating each of the plurality of data frames. The pilot tones have a non-overlapping allocation to the plurality of second communication devices and each first device-specific CFO is specific to the corresponding second communication device of the plurality of second communication devices. The method includes compensating, by the first communication device, the plurality of data frames based on the corresponding device-specific CFO. Each of the plurality of data frames includes a respective data portion having a plurality of OFDM symbols. The method also includes estimating, by the first communication device, respective second device-specific CFOs for channel estimation of the MIMO communication channel based on a current OFDM symbol of the plurality of OFDM symbols and the first device-specific CFO. The method also includes compensating, by the first communication device, the plurality of data frames based on the corresponding second device-specific CFO.

In another embodiment, a method for transmitting a data frame in a communication network includes receiving, at a first communication device and from a second communication device, a synchronization frame having an allocation indicator that indicates a non-overlapping allocation of pilot tones. The method also includes generating, by the first communication device, a first data frame that comprises a plurality of OFDM symbols of a data portion. The plurality of OFDM symbols including only pilot tones corresponding to the non-overlapping allocation of pilot tones. The method also includes transmitting, by the first communication device in response to the synchronization frame and via a MIMO communication channel, the first data frame to the second communication device simultaneously with a transmission of a second data frame by a third communication device via the MIMO communication channel. Corresponding OFDM symbols of respective non-legacy training field portions of the first data frame and the second data frame include non-overlapping pilot tones according to the non-overlapping allocation.

BRIEF DESCRIPTION OF THE DRAWINGS

FIG. 8A is a diagram of a data frame that includes a carrier frequency offset training field, according to an embodiment;

FIG. 8B is a diagram of a data frame that includes a carrier frequency offset training field, according to an embodiment;

FIG. 12 is a flow diagram of an example method for compensating for a carrier frequency offset, according to an embodiment;

DETAILED DESCRIPTION

In embodiments described below, a first communication device, such as an access point (AP) of a wireless local area network (WLAN), simultaneously receives multiple independent data frames from multiple second communication devices, such as client stations. As described herein, the multiple independent data frames are referred to collectively as a concurrent or simultaneous uplink transmission (SUT). When processing multiple data frames, each data frame may be transmitted with a different carrier frequency offset (CFO), timing offset, channel fading, or other radio characteristics that are specific to the corresponding second communication device. The first communication device uses a PHY preamble of the data frames to estimate a common CFO, i.e., a CFO that is common to each of the received data frames, and compensates each received data frame with the common CFO, in an embodiment. In some embodiments, the first communication device uses the PHY preamble to estimate a device-specific CFO, i.e., a CFO that is specific to the corresponding second communication device, and compensates the corresponding received data frame with the device-specific CFO. In an embodiment, the first communication device uses the PHY preamble, a data portion of a data frame, or both the PHY preamble and the data portion to estimate the device-specific CFO.

Figure 1:
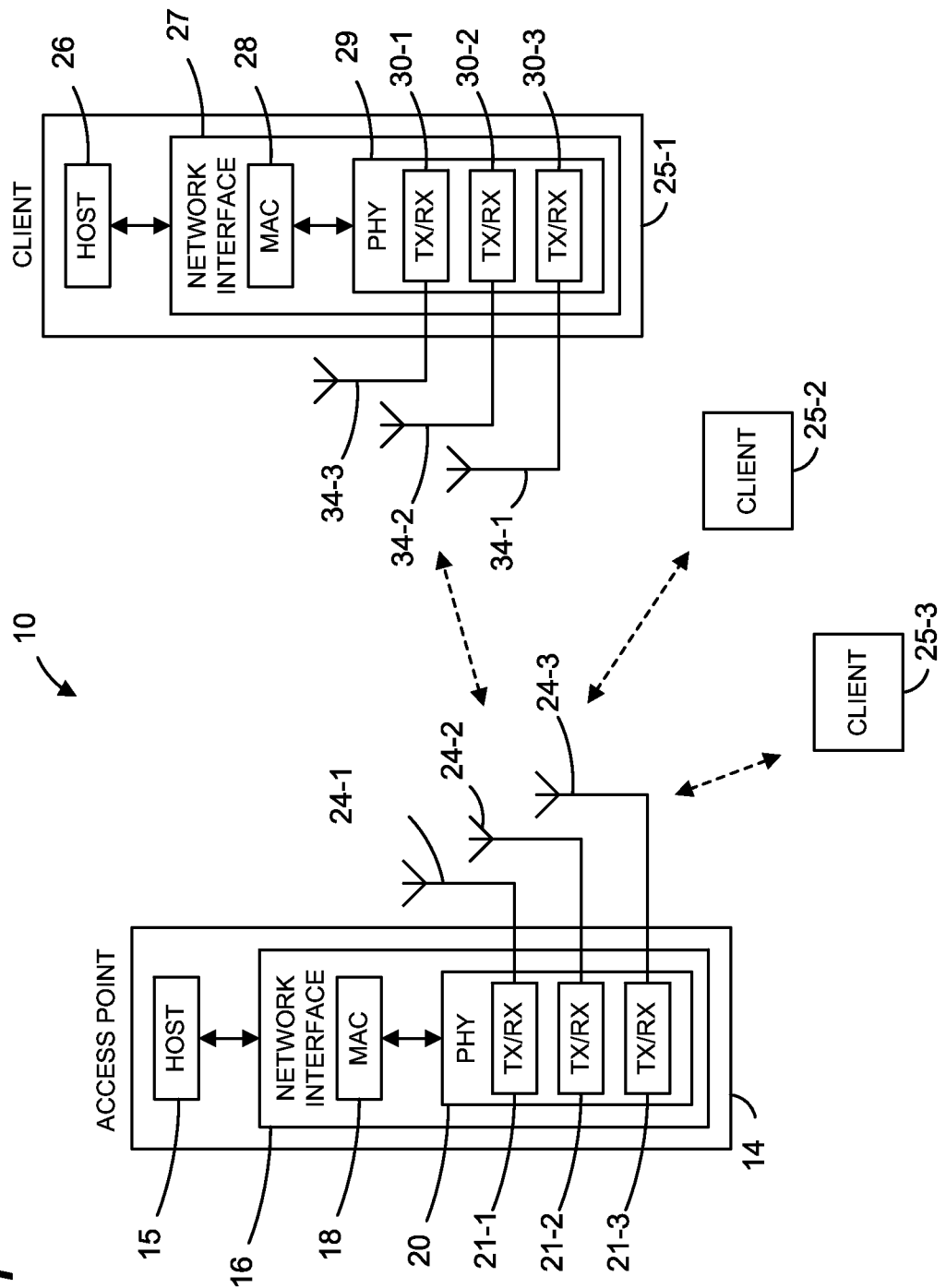
FIG. 1 is a block diagram of an example wireless local area network (WLAN), according to an embodiment.

FIG. 1 is a block diagram of an example wireless local area network (WLAN) 10, according to an embodiment. An AP 14 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers are coupled to a plurality of antennas 24. Although three transceivers 21 and three antennas 24 are illustrated in FIG. 1, the AP 14 can include different numbers (e.g., 1, 2, 4, 5, etc.) of transceivers 21 and antennas 24 in other embodiments.

The WLAN 10 includes a plurality of client stations 25. Although three client stations 25 are illustrated in FIG. 1, the WLAN 10 can include different numbers (e.g., 1, 2, 4, 5, 6, etc.) of client stations 25 in various scenarios and embodiments. In some embodiments, the AP 14 is configured to receive respective data streams or data frames that are transmitted simultaneously by two or more client stations 25. For example, in an embodiment, the AP 14 is configured to receive a simultaneous uplink transmission. In other embodiments, the AP 14 is configured, additionally or alternatively, to transmit independent data frames to the two or more of the client stations 25 simultaneously. In an embodiment, the two or more client stations 25 that transmit simultaneously are members of a client uplink group. In one embodiment, for example, the network interface 16 is configured to receive independent data streams transmitted simultaneously by multiple client stations 25 via different spatial streams using techniques described in U.S. Pat. No. 8,571,010, entitled "Simultaneous Uplink Transmission in a Wireless Network," filed on Jul. 20, 2010, which is hereby incorporated by reference.

A client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers are coupled to a plurality of antennas 34. Although three transceivers 30 and three antennas 34 are illustrated in FIG. 1, the client station 25-1 can include different numbers (e.g., 1, 2, 4, 5, etc.) of transceivers 30 and antennas 34 in other embodiments.

In an embodiment, one or more of the client stations 25-2 and 25-3 has a structure the same as or similar to the client station 25-1. In these embodiments, the client stations 25 structured like the client station 25-1 have the same or a different number of transceivers and antennas. For example, the client station 25-2 has only two transceivers and two antennas (not shown), according to an embodiment. In some embodiments, two or more of the client stations 25 are configured to transmit corresponding data streams to the AP 14 such that the AP 14 receives the data streams simultaneously. In other embodiments, additionally or alternatively, two or more of the client stations 25 are configured to receive respective data streams that are transmitted simultaneously by the AP 14. As another example, in another embodiment, the network interface 27, additionally or alternatively, is configured to transmit a data stream to the AP 14 among a plurality of independent data streams transmitted simultaneously by multiple client stations 25 via different spatial streams.

In an embodiment, the AP 14 and a plurality of the client stations 25 communicate data over a multiple input, multiple output (MIMO) communication channel defined, at the one end, by the antennas 24 of the AP 14 and, at the other end, by the antennas of the client stations 25. The client stations 25 as well as similar stations capable of transmitting independent uplink data to the AP 14, or to a similar network device, are referred to herein as "SUT-enabled stations" or "SUT-capable stations." In an embodiment, each of the client stations 25-1, 25-2, and 25-3 is configured to transmit multiple spatial streams via multiple transmit antennas. When space-time coding is employed, the multiple spatial streams are sometimes referred to by those of ordinary skill in the art as space-time streams. If the number of space-time streams is less than the number of transmit chains, spatial mapping and/or beamforming is employed, in some embodiments. Before receiving a simultaneous uplink transmission having a plurality of data frames, the AP requests the data frames from a group of stations, in some embodiments. In an embodiment, the AP defines an uplink group and notifies client stations in the uplink group about the uplink group allocation and indicates suitable uplink parameters by transmitting a synchronization frame to the client stations. In some embodiments, the AP transmits a synchronization frame that includes an allocation indicator that indicates a particular allocation of pilot tones for one or more OFDM symbols of the simultaneous uplink transmission.

Figure 2:
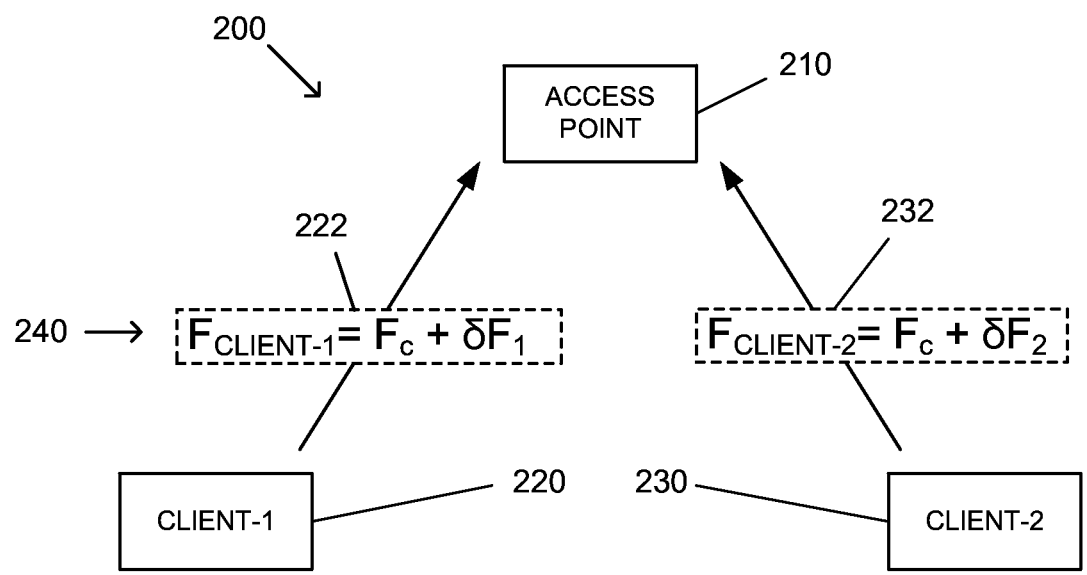
FIG. 2 is a diagram of an example simultaneous transmission in a WLAN, according to an embodiment.

FIG. 2 is a diagram of example simultaneous uplink transmissions in a WLAN 200, according to an embodiment. The WLAN 200 includes an access point 210 that receives a plurality of data frames transmitted simultaneously from respective ones of a plurality of second communication devices via a multiple-input, multiple output (MIMO) communication channel. In the embodiment shown in FIG. 2, the plurality of second communication devices includes a first client station 220 (CLIENT-1) and a second client station 230 (CLIENT-2). While only two client stations are illustrated for clarity, the plurality of second communication devices can include additional client stations, in other embodiments and/or scenarios.

In the embodiment shown in FIG. 2, the plurality of data frames includes a first data frame 222, transmitted by the first client station 220 using a first spatial stream of the MIMO communication channel, and a second data frame 232, transmitted by the second client station 230 using a second spatial stream of the MIMO communication channel. Although the first client station 220 and second client station 230 transmit the corresponding data frames simultaneously, each data frame may be transmitted with a different device carrier frequency offset (CFO), timing offset, channel fading, or other radio characteristics that are specific to the corresponding client station (i.e., due to variations in the transceiver 30 and/or antenna 34) or spatial stream path. In various embodiments and/or scenarios, the access point 210 estimates a common carrier frequency offset (CFO) that is common to each of the plurality of data frames based on a legacy portion of a physical layer (PHY) preamble of the plurality of data frames. In an embodiment, the access point 210 compensates each of the plurality of data frames based on the estimated common CFO.

Each of the data frames 222 and 232 includes a respective plurality of orthogonal frequency division multiplexing (OFDM) symbols. The OFDM symbols include a plurality of subcarriers, such as data tones and/or pilot tones, with corresponding carrier frequencies. As an example, in an embodiment, the data frame 222 and data frame 232 each includes a pilot tone with a reference carrier frequency $F_C$ at which a corresponding OFDM constellation should be transmitted. In this example, the first client station 220 transmits the pilot tone at a carrier frequency $F_{CLIENT-1}$, which is equal to the reference carrier frequency $F_C$ offset by a frequency $\delta F_1$, and the second client station 230 transmits the pilot tone at a carrier frequency $F_{CLIENT-2}$, which is equal to the reference carrier frequency $F_C$ offset by a frequency $\delta F_2$. In this example, the common CFO for both the first data frame 222 and the second data frame 232 is equal to $(\delta F_1 + \delta F_2)/2$. A device-specific CFO (i.e., CFO specific to the transmitting device) is equal to a residual amount of the carrier frequency offset. For example, the first data frame 222 has a device-specific CFO equal to $(\delta F_1 - \delta F_2)/2$ and the second data frame 232 has a device-specific CFO equal to $(\delta F_2 - \delta F_1)/2$.

Figure 3:
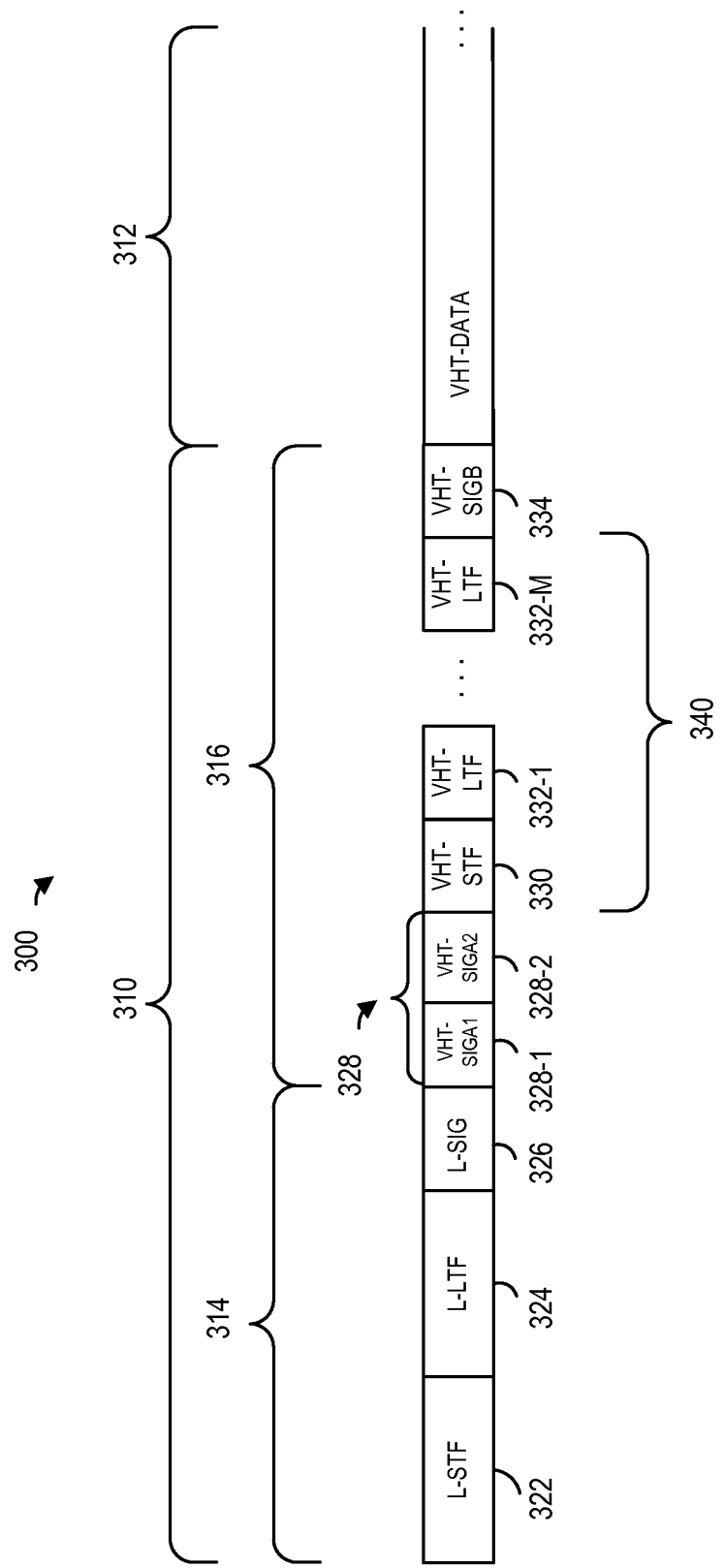
FIG. 3 is a diagram of a data frame format, according to an embodiment.

FIG. 3 is a diagram of a data frame format 300 that the AP 14 is configured to receive from the client stations 25 via OFDM modulation, according to an embodiment. In an embodiment, the client stations 25 are also configured to transmit the data frame 300 to the AP 14. The data frame 300 conforms to the IEEE 802.11ac Standard and is designed for "Mixed field" situations. The data frame 300 occupies a 20 MHz bandwidth. In other embodiments or scenarios, a data frame similar to the data frame 300 occupies a different bandwidth, such as a 40 MHz, an 80 MHz, or a 160 MHz bandwidth.

The data frame 300 includes a physical layer (PHY) preamble 310 and a data portion 312. The PHY preamble 310 includes a legacy portion 314 and a non-legacy portion 316. The legacy portion 314 includes a legacy short training field (L-STF) 322, generally used for packet detection, initial synchronization, and automatic gain control, etc., a legacy long training field (L-LTF) 324, generally used for channel estimation and fine synchronization, and a legacy signal field (L-SIG) 326, used to carry certain PHY parameters with the data frame 300, such as modulation type and coding rate used to transmit the data frame, for example. The non-legacy portion 316 includes two first very high throughput signal fields (VHT-SIGAs) 328 including a first very high throughput signal field (VHT-SIGA1) 328-1 and a second very high throughput signal field (VHT-SIGA2) 328-2, a very high throughput short training field (VHT-STF) 330, M very high throughput long training fields (VHT-LTFs) 332, where M is an integer, and a second very high throughput signal field (VHT-SIGB) 334. In some embodiments and/or scenarios, the legacy portion 314 includes fields where each client station transmits a same signal, for example, the L-STF 322, the L-LTF 324, and the L-SIG 326. In an embodiment, the legacy portion 314 also includes the VHT-SIGA1 328-1.

In various embodiments, the access point 210 estimates the common CFO using the legacy portion 314 of the PHY preamble 310. In an embodiment, the access point 210 performs a "coarse" common CFO estimation using a phase of autocorrelation of the L-STF 322 where the phase is caused by the common CFO across a period for the autocorrelation. In some embodiments, the access point 210 determines the autocorrelation output between a first time when carrier sensing (CS) is triggered and a second time when symbol timing (ST) is completed. In an embodiment, the access point 210 performs a common CFO estimate by comparing a phase difference between two adjacent OFDM symbols of the L-LTF 324 in the time domain. In an embodiment, the access point 210 performs a common CFO estimate by estimating a phase difference between pilot tones of the MIMO communication channel for i) the L-LTF-324, and ii) one of the L-SIG 326, the VHT-SIGA1 328-1, or the VHT-SIGA2 328-2. In this embodiment, the phase difference is caused by the common CFO across 4 microseconds (using L-SIG 326), 8 microseconds (using VHT-SIGA1 328-1), or 12 microseconds (using VHT-SIGA2 328-2, when available). In some embodiments, the access point 210 estimates the common CFO and compensates a received signal for the data frame in the time domain for each field of the legacy portion 314 described above (e.g., L-STF 322, L-LTF 324, L-SIG 326, VHT-SIGA1 328-1, VHT-SIGA2 328-2) such that the residual CFO is successively reduced during processing.

After the access point 210 compensates the received signal for the data frame using the legacy portion 314, each data frame may have a residual CFO, i.e., a device-specific CFO for the corresponding client station, which affects MIMO channel estimation accuracy. In various embodiments, the access point 210 estimates the device-specific CFO using a device-specific common phase error (CPE) to adjust the received signal for the corresponding data frame to improve the MIMO channel estimation accuracy. In some embodiments and/or scenarios, the access point 210 uses a first scheme for performing channel estimation by determining the device-specific CPE based on pilot tones within a non-legacy training field portion 340 of the data frame 300. In an embodiment, the non-legacy training field portion 340 includes the VHT-STF 330 and the VHT-LTFs 332. In other embodiments, the access point 210 uses a second scheme for performing the channel estimation by determining the device-specific CPE based on a reference OFDM symbol, such as a reference non-legacy long training field. In some embodiments, the access point 210 uses a third scheme for pilot based channel estimation using a pilot tone allocation that is compatible with the Institute for Electrical and Electronics Engineers (IEEE) 802.11n standard.

Figure 4A:
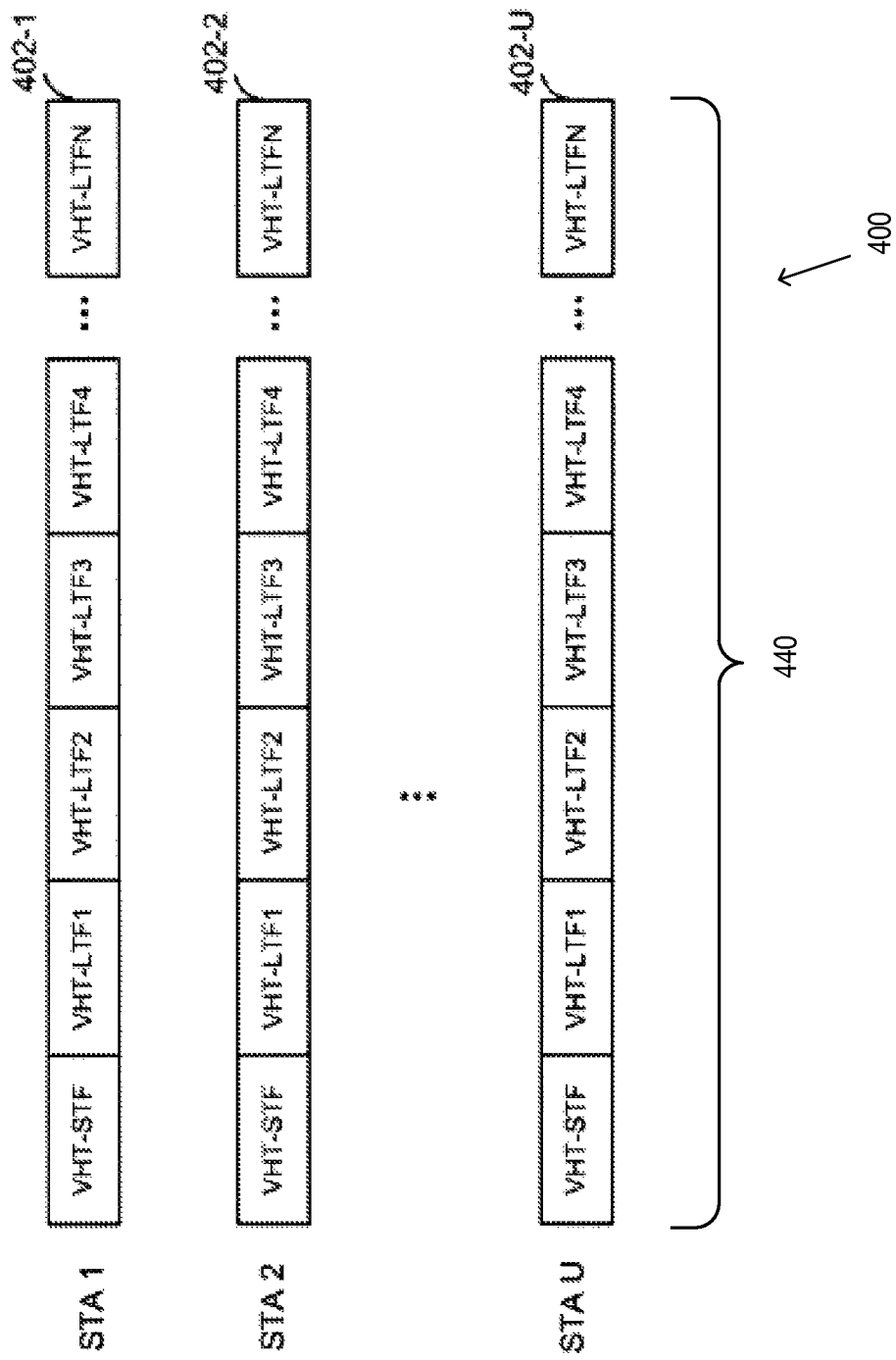
FIG. 4A is a diagram of a non-legacy training field portion of a physical layer (PHY) preamble that includes several long training fields for simultaneous transmission to an access point (AP), according to an embodiment.

FIG. 4A is a diagram of a non-legacy training field portion 440 of a PHY preamble 400 that includes several long training fields for simultaneous transmission to an access point (AP), according to an embodiment. The non-legacy training field portion 440 includes respective sequences 402-1, 402-2, . . . 402-U of VHT-LTFs within data frames transmitted by an integer number U of "users" or SUT-capable stations (STA 1, STA 2, . . . STA U), in an embodiment. Each of the stations 1, 2, . . . U transmits a same number ($N_{STS\_SUT}$) of VHT-LTFs to jointly train a large MIMO communication channel, as described in the '010 patent incorporated by reference above. As one example, $N_{STS\_SUT}$ can be eight, but in general, $N_{STS\_SUT}$ is equal to a total number of space-time streams of the MIMO communication channel between the U SUT-capable stations and an AP or other suitable communication device.

In some embodiments, the access point 210 performs a joint channel estimation including determining the device-specific CPE (i.e., a device-specific CFO) based on pilot tones within the non-legacy training field portion 440. In an embodiment, the access point 210 allocates pilot tones for transmission of the long training fields 332 to the client stations 25 such that each client station 25 transmits the long training fields 332 using only the corresponding pilot tones.

In an embodiment, the access point 210 allocates a pilot tone m of each OFDM symbol during the VHT-LTF to user u (i.e., a client station of the U client stations) as:

$$u = m \bmod U, \; m = 0, 1, 2, \ldots N_{pilot} - 1 \quad \text{(Equ. 1)}$$

where u is an integer index for the client station, m is an integer index for pilot tones for transmission of the long training fields 332, and $N_{pilot}$ is an integer number of the pilot tones for transmission of the long training fields 332. In some embodiments and/or scenarios, the access point 210 selects the user index u based on a signal to noise ratio (SNR) or modulation and coding scheme (MCS). For example, in an embodiment, the users are indexed such that a lower SNR or higher MCS is ranked first, which allows for additional pilot tones as compared to later ranked users if the number of client stations U is less than the number of pilots $N_{pilot}$. In an embodiment, a client station is allocated multiple antennas or space-time streams and the client station uses the single stream pilot tones such that each transmission antenna of the client station uses a same scaling of one.

In various embodiments, such as joint channel estimation, the access point 210 estimates the device-specific CPE per OFDM symbol n of user u as:

$$\hat{\phi}_{u,n} = \angle \left( \sum_{m \in UserU} r_m^H(n) \cdot r_m(n+1) \cdot P_{(u)}(1, n) \cdot P_u(1, n+1) \right), \quad \text{(Equ. 2)}$$

$$n = 1 \ldots N_{VHTLTF} - 1$$

where m is the index of pilot tones assigned to user u and $r_m(n)$ is a received signal on pilot tone m of the $n^{th}$ VHT-LTF OFDM symbol. In some embodiments, the access point 210 uses the device-specific CPE for one symbol as an output CPE when performing the compensation. In other embodiments, the access point 210 determines an average of the device-specific CPEs across multiple OFDM symbols as the output CPE. In an embodiment, the output CPE for user u is a linear average over all the VHT-LTFs:

$$\hat{\phi}_u = \frac{1}{N_{VHTLTF} - 1} \sum_{n=1}^{N_{VHTLTF}} \hat{\phi}_{u,n} \quad \text{(Equ. 3)}$$

In another embodiment, the access point 210 estimates the output CPE as:

$$\hat{\phi}_{u,n} = \angle \left( \sum_{n=1 \ldots N_{VHTLTF}-1} \sum_{m \in UserU} r_m^H(n) \cdot r_m(n+1) \cdot P_{(u)}(1, n) \cdot P_u(1, n+1) \right) \quad \text{(Equ. 4)}$$

After determination of the output CPE, the access point 210 determines a channel estimate using the output CPE to compensate for the carrier frequency offset, in various embodiments. The access point 210 removes or "cancels out" the corresponding training sequence (e.g., a VHT-LTF training sequence) from a received signal $r_k(n)$ for each OFDM symbol to obtain a received signal without the long training sequence $y_k$:

$$y_k(n) = r_k(n) * VHTLTF_k \quad \text{(Equ. 5)}$$

where k is an integer index of non-zero subcarriers (i.e., data tones and pilot tones), $n = 1 \ldots N_{VHTLTF}$ (the number of OFDM symbols for the training sequence).

In an embodiment, the access point 210 estimates a channel matrix (e.g., performs channel estimation) for the user u on subcarrier k, using the device-specific CPE $\hat{\phi}_u$ as:

$$\hat{H}_{u,k} = [y_k(1) y_k(2) \ldots y_k(N_{VHTLTF})] \cdot \tilde{P}_u^{-1} \quad \text{(Equ. 6)}$$

where $\tilde{P}$ is the equivalent P matrix with compensation for the device-specific CPE taken into account. The CPO is equal to $\hat{\phi}_u$ if the $i^{th}$ antenna belongs to the user u and thus:

$$\tilde{P} = \begin{bmatrix} P_{11} & P_{12} e^{j\phi_1} & \ldots & P_{1N} e^{j(N-1)\phi_1} \\ P_{21} & P_{22} e^{j\phi_2} & \ldots & P_{2N} e^{j(N-1)\phi_2} \\ \vdots & \vdots & \ldots & \vdots \\ P_{N1} & P_{N2} e^{j\phi_N} & \ldots & P_{NN} e^{j(N-1)\phi_N} \end{bmatrix} \quad \text{(Equ. 7)}$$

where, for clarity, N is the number $N_{VHTLTF}$ of OFDM symbols of the training field. The access point 210 uses a matrix inversion method to determine the inverse of $\tilde{P}$ in various embodiments. In some scenarios, where the inter-user CPE is relatively small, such that $e^{(\hat{\phi}_u - \hat{\phi}_v)} \approx 1$ for user u and user v, the channel estimation equation can be simplified and evaluated as:

$$\hat{H}_{u,k} = [y_k(1) y_k(2) e^{-j\hat{\phi}_u} \ldots y_k(N_{VHTLTF}) e^{-j\hat{\phi}_u(N_{VHTLTF}-1)}] \cdot \frac{1}{p_{(u)}^H} \quad \text{(Equ. 8)}$$

where the channel estimate for pilot subcarriers of the user u are taken from the first column of the matrix $\hat{H}_{u,k}$. In some embodiments where the client stations do not transmit on all pilot tones (e.g., tone allocation according to Equ. 1), the client station boosts a transmit power on the corresponding allocated pilot tones, while still meeting a spectrum mask. In one such embodiment, the channel estimation benefits from a higher SNR on the pilot tone and thus an improved CPE estimation.

Figure 4B:
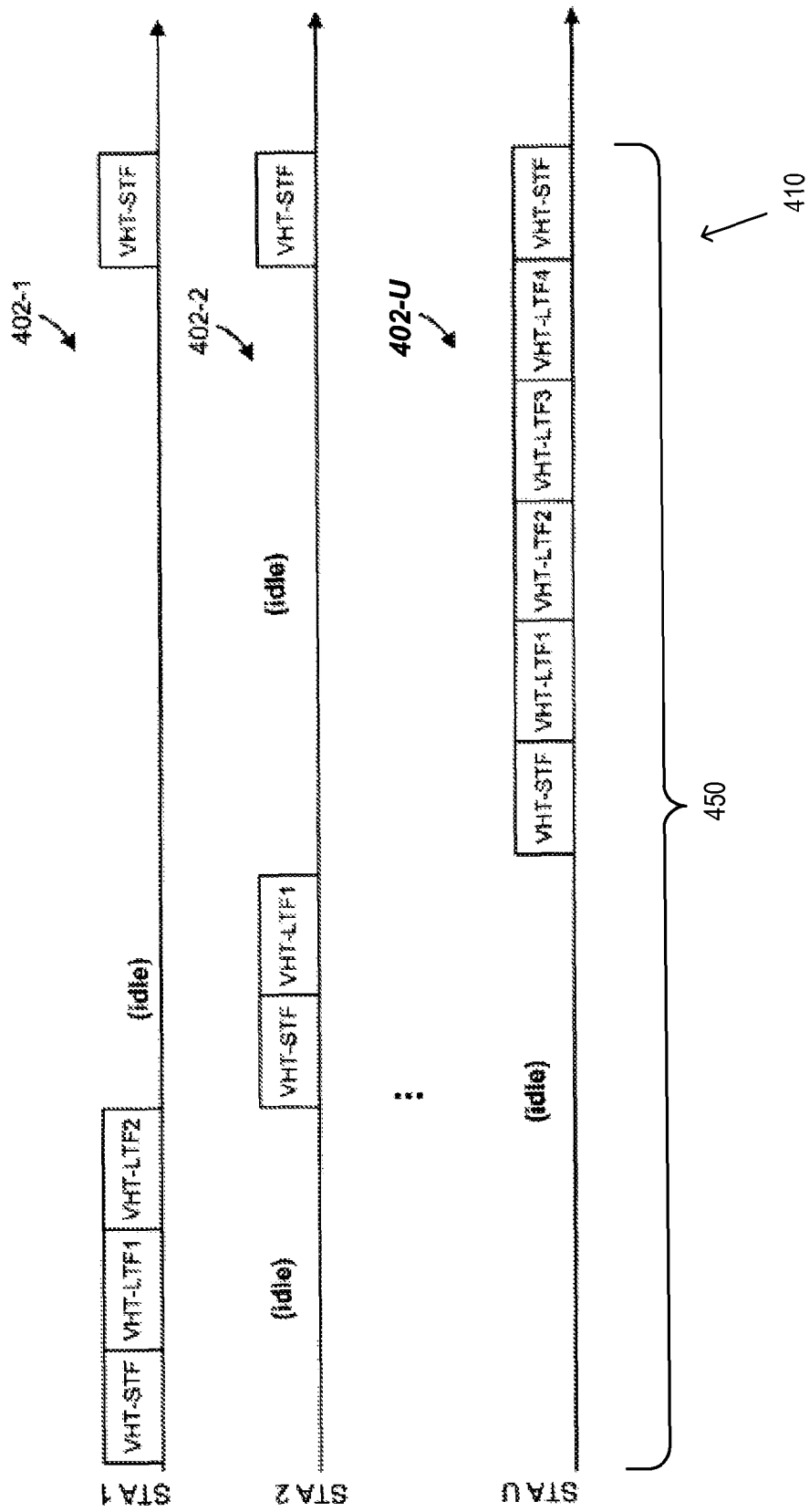
FIG. 4B is a diagram of a non-legacy training field portion of a PHY preamble that includes several long training fields for staggered transmission to an AP, according to an embodiment.

While the above description describes a joint approach, in another embodiment, client stations use a staggered approach for transmission for the access point 210 to estimate the MIMO communication channel. In other words, rather than training the MIMO communication channel simultaneously, two or more client stations sequentially transmit training data so that the AP can estimate respective space-time streams. Of course, once the MIMO communication channel is properly estimated, an AP can simultaneously receive station-specific data. FIG. 4B is a diagram of a non-legacy training field portion 450 of a PHY preamble 410, according to an embodiment. The non-legacy training field portion 450 illustrates an example staggered approach to estimate a MIMO communication channel, as described in the '010 patent incorporated by reference above. In an embodiment, the access point 210 performs a staggered channel estimation including determining the device-specific CPE (i.e., a device-specific CFO) based on pilot tones within a non-legacy training field portion 450. Client stations 1, 2, . . . U transmit PHY preambles having portions 402-1, 402-2, . . . 402-U. In an embodiment, client station 1 transmits a short training field VHT-STF followed by two long training fields, while client stations 2-U remain idle, i.e., do not transmit data to the AP. Next, client station 2 transmits a VHT-STF followed by a VHT-LTF, while all other client stations are idle. A cycle of staggered MIMO channel estimation for SUT communications completes when client station U transmits a VHT-STF followed by four VHT-LTFs while all other client stations are idle, according to the example scenario of FIG. 4B.

In the embodiment shown in FIG. 4B, each client station transmits on all pilot tones during a corresponding transmission period. If the client station has more than one antenna, a P matrix is used and the pilot tones use the repeated first row of the P matrix, as defined in the IEEE 802.11ac standard. In an embodiment, the access point 210 estimates the device-specific CPE for a client station u as:

$$\hat{\phi}_{u,n} = \angle \left( \sum_{m \in Pilots} y_m^H(n) \cdot y_m(n+1) \cdot P_{(u)}(1,n) \cdot P_u(1,n+1) \right) \quad \text{(Equ. 9)}$$

where n=1, 2, ... $N_{STS,u}$−1 (a number of space-time streams for the client station u). Similarly to the joint approach described above, in some embodiments, the access point 210 performs a linear average over the VHT-LTFs for the output CPE. In another embodiment, the access point 210 determines the output CPE as:

$$\hat{\phi}_{u,n} = \angle \left( \sum_{n=1...N_{STS,u}-1} \sum_{m \in Pilots} y_m^H(n) \cdot y_m(n+1) \cdot P_{(u)}(1,n) \cdot P_u(1,n+1) \right) \quad \text{(Equ. 10)}$$

After determination of the output CPE, the access point 210 determines the channel estimate as described above with respect to the joint approach.

Figure 4C:
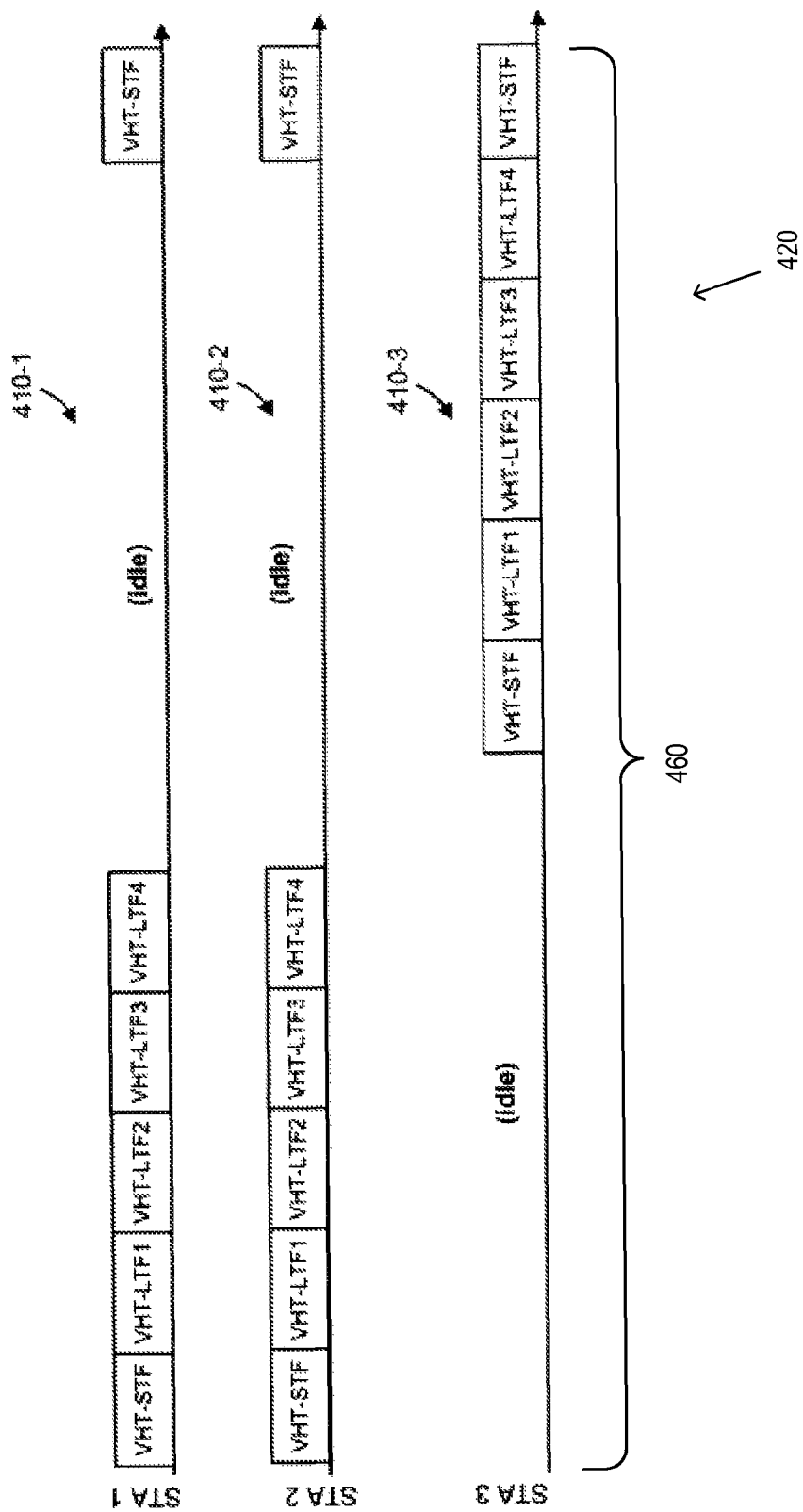
FIG. 4C is a diagram of a non-legacy training field portion of a PHY preamble that includes several long training fields for mixed simultaneous/staggered transmission to an AP, according to an embodiment.

FIG. 4C is a diagram of a non-legacy training field portion 460 of a PHY preamble 420 that includes several long training fields for mixed simultaneous/staggered transmission to an AP, according to an embodiment. Client stations 1, 2, and 3 in another embodiment utilize a mixed technique that includes both concurrent (i.e., joint) VHT-LTF transmissions and staggered VHT-LTF transmissions, as described in the '010 patent incorporated by reference above. Client stations 1 and 2 simultaneously transmit a group of four VHT-LTFs in frames 410-1 and 410-2, respectively, while client station 3 is idle. Together, client stations 1 and 2 form a first group of client stations. Next, client station 3 transmits four VHT-LTFs in a frame 410-3 while client stations 1 and 2 are idle. In this example, client station 3 forms a second group of client stations. In an embodiment, an AP announces the grouping of client stations in a synchronization frame. Using the grouping information, client stations can calculate the corresponding idle periods. In an embodiment, each group of client stations sends a group-specific VHT-STF for automatic gain control adjustment. The VHT-LTFs of each user are sent group by group as in the '010 patent. Within each group, the pilot tones are allocated to each user in the group as in the joint approach described above, according to the user index as u=m mod U, m=0, 1, 2, ... $N_{pilot}$−1. The P matrix is used in each group and the pilot tones use the repeated first row of the P as defined in the IEEE 802.11ac standard. In this embodiment, the access point 210 estimates the device-specific CPE for user u as:

$$\hat{\phi}_{u,n} = \angle \left( \sum_{m \in User u} y_m^H(n) \cdot y_m(n+1) \cdot P_{(u)}(1,n) \cdot P_u(1,n+1) \right)$$

where n=1, 2, ... $N_{STS,u}$−1 (the number of space-time streams for user u). Similarly to the joint approach described above, in some embodiments, the access point 210 performs a linear average over the VHT-LTFs for the output CPE. In another embodiment, the access point 210 determines the output CPE as:

$$\hat{\phi}_u = \angle \left( \sum_{n=1...N_{STS,u}-1} \sum_{m \in User u} y_m^H(n) \cdot y_m(n+1) \cdot P_{(u)}(1,n) \cdot P_u(1,n+1) \right) \quad \text{(Equ. 12)}$$

After determination of the output CPE, the access point 210 determines the channel estimate as described above with respect to the joint approach.

Figure 5:
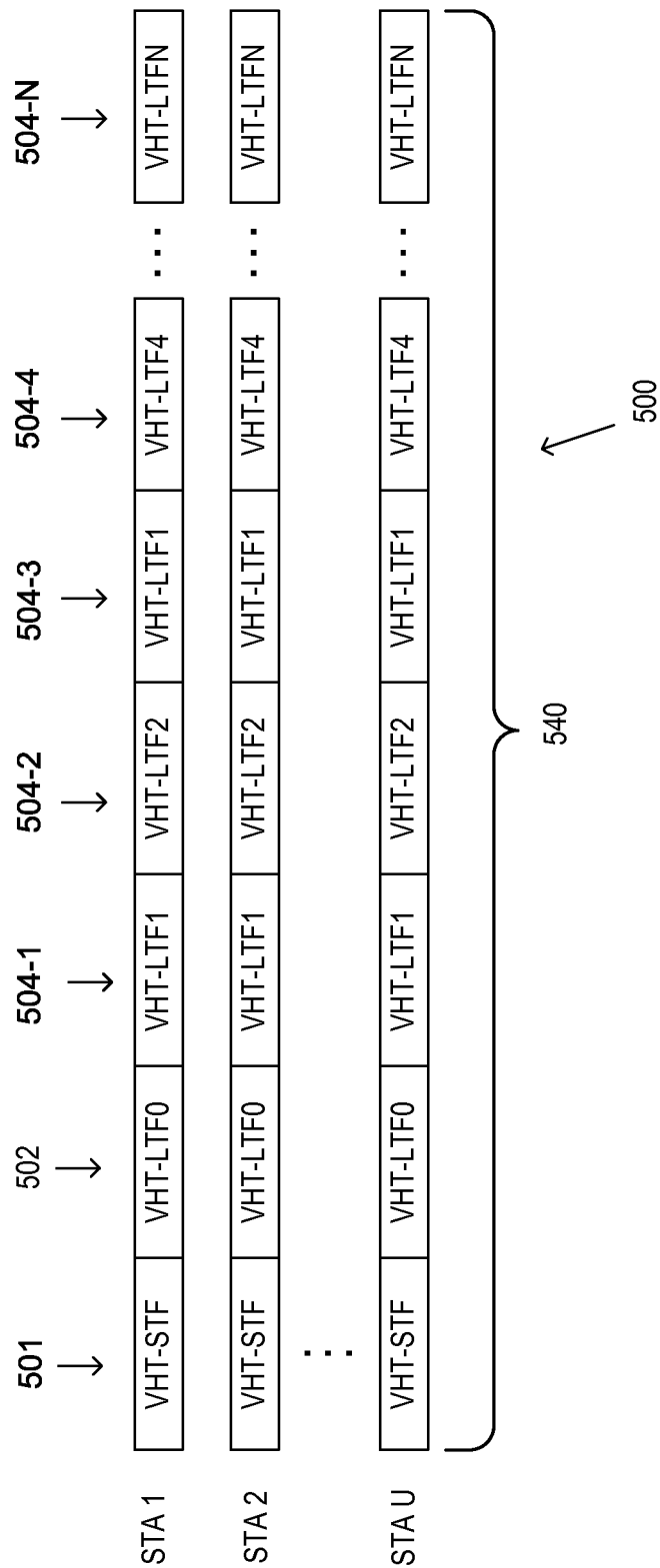
FIG. 5 is a diagram of a non-legacy training field portion of a PHY preamble that includes several long training fields for simultaneous transmission to an AP, according to an embodiment.

FIG. 5 is a diagram of a non-legacy training field portion 540 of a PHY preamble 500 that includes several long training fields for concurrent transmission to an access point, according to an embodiment. In various embodiments, each data frame includes a VHT-STF field 501 that is compatible with the VHT-STF as defined in the IEEE 802.11ac standard, a reference field 502, and a plurality of VHT-LTF fields 504. In the embodiment shown in FIG. 5, the reference field 502 is inserted by the corresponding client station between the VHT-STF 501 and the VHT-LTF fields 504. In an embodiment, the reference field 502 is a duplicate of a first VHT-LTF field 504-1 of the plurality of VHT-LTF fields 504.

In various embodiments and/or scenarios, CFO estimation is improved by using more subcarriers in the estimation. In the embodiment shown in FIG. 5, non-zero subcarriers (i.e., data tones and pilot tones) are allocated in a non-overlapping manner to different transmit antennas for channel estimation using one of a block allocation or an interleaved allocation. As described above, the client station boosts a transmit power on the corresponding allocated tones, while still meeting a spectrum mask for the non-legacy training field portion 540, in some embodiments. In the embodiment shown in FIG. 5, a P matrix is not used for the VHT-LTF transmission.

Figures 6A, 6B:
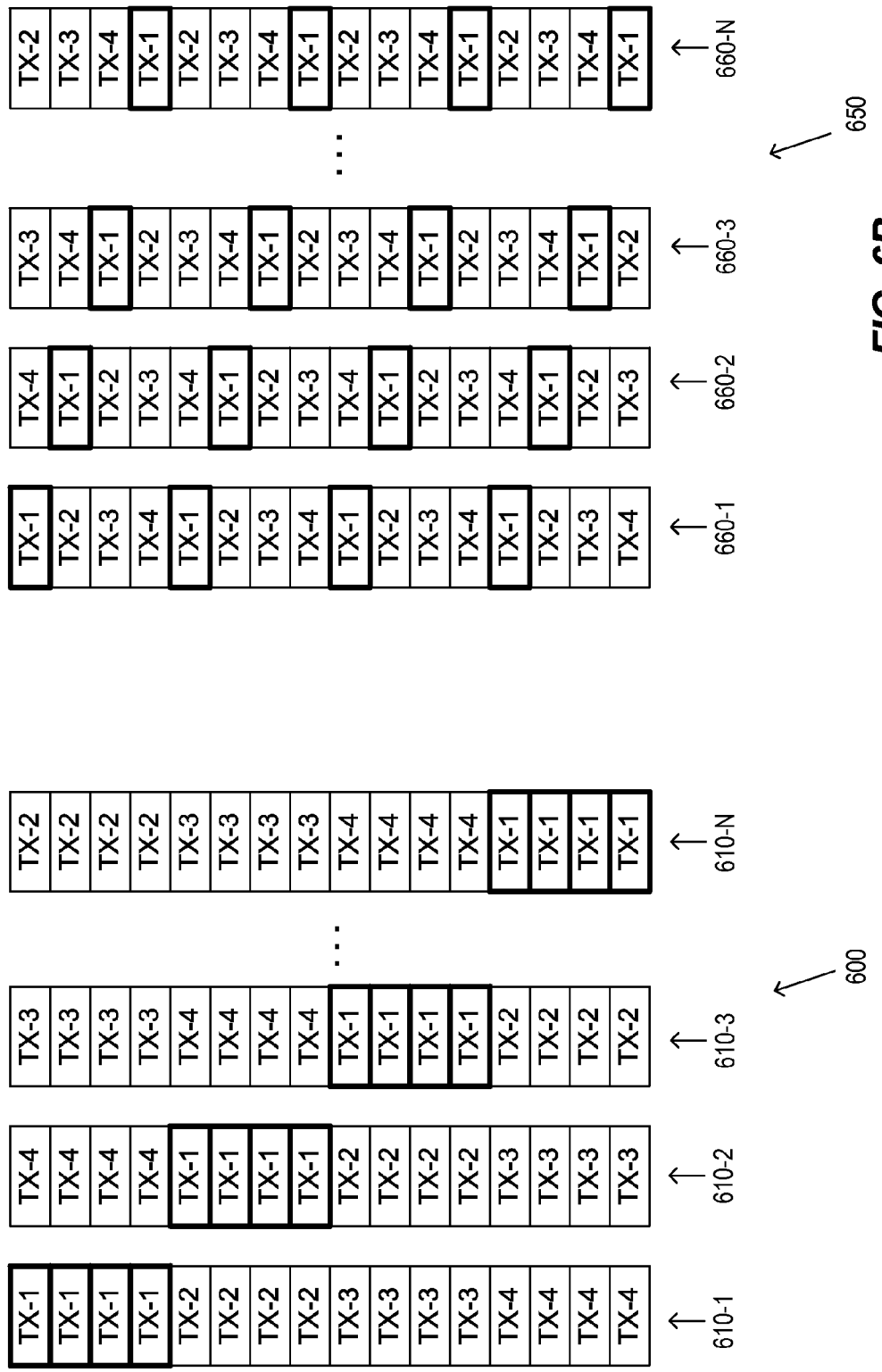
FIG. 6A is a diagram of a block allocation of subcarriers for several long training fields, according to an embodiment.
FIG. 6B is a diagram of an interleaved allocation of subcarriers for several long training fields, according to an embodiment.

FIG. 6A is a diagram of a block allocation 600 of subcarriers for several long training fields 610, according to an embodiment. Using the block allocation 600 of tones, a transmit antenna i is allocated a continuous trunk or block of subcarriers for the $n^{th}$ VHT-LTF according to $$\left\{ \frac{N_{subcarrier}}{N_{VHTLTF}} [((i+n)-2) \bmod (N_{VHTLTF}+1)] + 1 \right\} : \quad \text{(Equ. 13)}$$

$$\frac{N_{subcarrier}}{N_{VHTLTF}} [((i+n)-2) \bmod (N_{VHTLTF}+1) + 1]$$

In the embodiment shown in FIG. 6A, four transmit antennas TX-1, TX-2, TX-3, and TX-4 have the block allocation 600 of sixteen subcarriers over an integer number N of long training fields 610.

FIG. 6B is a diagram of an interleaved allocation 650 of subcarriers for several long training fields 660, according to an embodiment. Using the interleaved allocation 650 shown in FIG. 6B, a transmit antenna i is allocated a scattered set of subcarriers for the $n^{th}$ VHT-LTF according to $$\{[((i+n)-2)\mod(N_{VHTLTF}+1)]\cdot N_{VHTLTF}\cdot[N_{subcarrier}-N_{VHTLTF}+((i+n)-2)\mod(N_{VHTLTF}+1)]\} \quad \text{(Equ. 14)}$$

In the embodiment shown in FIG. 6B, four transmit antennas TX-1, TX-2, TX-3, and TX-4 have the interleaved allocation 650 of sixteen subcarriers over an integer number N of long training fields 660.

Using the block allocation 600 or interleaved allocation 650, the access point 210 estimates the device-specific CPE based on OFDM symbols of the reference field 502 (VHT-LTF0) and the first OFDM symbol of the VHT-LTF1 field 504-1, in various embodiments. In an embodiment, the access point 210 estimates the device-specific CPE for a client station u as:

$$\hat{\phi}_u = \angle\left(\sum_{m \in User u} r_m^H(0) \cdot r_m(1)\right) \quad \text{(Equ. 15)}$$

where $r_m(n)$ is the received signal array on subcarrier m of the $n^{th}$ VHT-LTF OFDM symbol.

After determination of the device-specific CPE in Equation 15, the access point 210 determines a channel estimate for the antenna i on subcarrier m, using the device-specific CPE according to:

$$\hat{H}_{i,k} = y_k(n) e^{-j\hat{\phi}_{i(u)}(n-1)} \quad \text{(Equ. 16)}$$

where index n is the VHT-LTF index that antenna i is transmitting on subcarrier k and if antenna i belongs to user u, the $\hat{\phi}_{u(i)} = \hat{\phi}_u$.

For the block allocation, the index n is determined according to:

$$n = \left\{\left\lfloor\frac{kN_{VHTLTF}}{N_{subcarrier}}\right\rfloor + u\right\} \mod(N_{VHTLTF} + 1) \quad \text{(Equ. 17)}$$

For the interleaved allocation, the index n is determined according to:

$$n = (k+i) \mod(N_{VHTLTF}+1) \quad \text{(Equ. 18)}$$

In an embodiment, the access point 210 uses the third scheme for pilot based channel estimation using a pilot tone allocation that is compatible with the IEEE 802.11n standard. In this embodiment, each client station simultaneously transmits using same (i.e., overlapping) pilot tones using the pilot tone design defined in the IEEE 802.11n standard and the access point 210 performs a channel estimation without compensation for the device-specific CPE. Accordingly, the access point 210 relies upon the data portion 312 for estimation of the device-specific CPE and compensation.

Figure 7:
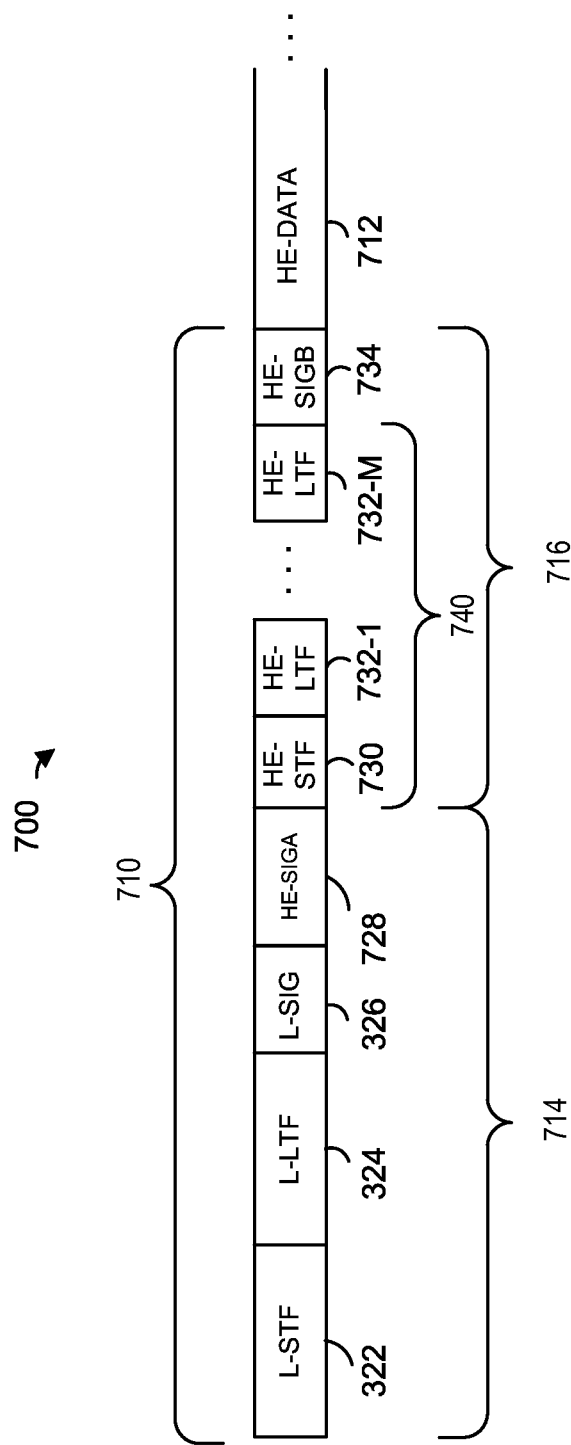
FIG. 7 is a diagram of a portion of a data frame that includes a legacy portion for carrier phase estimation, according to an embodiment.

In IEEE 802.11ac, and some standards in development such as IEEE 802.11ax ("High Efficiency Wi-Fi"), a duplicate 20 MHz transmission is used for a legacy portion of a PHY preamble. FIG. 7 is a diagram of a portion of a data frame 700 that includes a PHY preamble 710 and a data portion 712 according to a proposed implementation of IEEE 802.11ax. The PHY preamble 710 includes a legacy portion 714 and a non-legacy portion 716. In the embodiment of FIG. 7, the legacy portion 714 includes the L-STF 322, the L-LTF 324, the L-SIG 326, and a high efficiency signal field (HE-SIGA) 728. The non-legacy portion 316 includes a high efficiency short training field (HE-STF) 730, M high efficiency long training fields (HE-LTFs) 732, where M is an integer, and a second high efficiency signal field (HE-SIGB) 734. A non-legacy training field portion 740 includes the HE-STF 730 and the HE-LTFs 732, in an embodiment.

In various embodiments, the access point 210 determines the device-specific CPE using the legacy portion 714 of the data frame (e.g., from L-LTF to VHT-SIGA or HE-SIGA). In an embodiment, the access point 210 determines the device-specific CPE in both the legacy portion 714 and the non-legacy long training portion 316 as described above with respect to FIG. 3 for the first and second schemes to improve the estimation accuracy of the device-specific CPE. In another embodiment, the access point 210 determines the device-specific CPE in both the legacy portion 714 and the non-legacy long training portion 316 as described above with respect to FIG. 3 for the third scheme to improve the channel estimate.

In an embodiment, the access point 210 determines the common CFO estimate and the device-specific CPE using the legacy portion 310 or legacy portion 710. For example, in an embodiment, the access point 210 compares a phase difference between two adjacent OFDM symbols of the L-LTF 324 in the time domain and determines the device-specific CPE between orthogonal pilot tones for i) the L-LTF-324, and ii) one of the L-SIG 326, the VHT-SIGA1 328-1, the VHT-SIGA2 328-2, or corresponding OFDM symbols of an HE-SIGA field.

According to the IEEE 802.11ac standard, from L-LTF to HE-SIGA, each 20 MHz band has four pilot tones. Thus, for a signal of bandwidth BW, there is a total number of pilot tones $N_{pilot}=4*BW/20$ MHz pilots in each OFDM symbol. In an embodiment, the access point 210 allocates pilot tones for transmission of the long training fields 732 from the client stations 25 such that each client station 25 transmits the long training fields 732 using only the corresponding pilot tones (i.e., a non-overlapping allocation). The pilot tone m of each OFDM symbol during the HE-LTF is assigned to user u as:

$$u = m \mod U, \ m=0,1,2,\ldots N_{pilot}-1 \quad \text{(Equ. 19)}$$

where u is an integer index for a user (i.e., a client station) of the SUT-capable stations, m is an integer index for pilot tones for transmission of the long training fields 732, and $N_{pilot}$ is an integer number of the pilot tones for OFDM symbols of the long training fields 732. In some embodiments and/or scenarios, the access point 210 selects the user index u based on a signal to noise ratio (SNR) or modulation and coding scheme (MCS). For example, in an embodiment, the users are indexed such that a lower SNR or higher MCS is ranked first (i.e., with a lower index value), which allows for additional pilot tones as compared to some subsequently ranked users if the number of client stations U is less than the number of pilots $N_{pilot}$. In an embodiment, a client station is allocated multiple antennas or space-time streams and the client station uses the single stream pilot tones such that each transmission antenna of the client station uses a same scaling of one.

In an embodiment, the access point 210 estimates the device-specific CPE per OFDM symbol n of user u as $$\hat{\phi}_{u,n} = \angle\left(\sum_{m \in User U} r_m^H(n) \cdot r_m(n+1)\right), n = 1 \ldots N-1 \quad \text{(Equ. 20)}$$

where m is the index of pilot tones allocated to user u, N is the total number of OFDM symbols included in the L-LTF, L-SIG, and HE-SIGA fields, and $r_m^H(n)$ is the received signal on pilot tone m of the $n^{th}$ OFDM symbol after the L-STF.

In some embodiments, the access point 210 averages the output CPE for client station u over the OFDM symbols included in the L-LTF, L-SIG, and HE-SIGA fields. In one such embodiment, the output CPE is a linear average, determined as:

$$\hat{\phi}_u = \frac{1}{N-1}\sum_{n=1}^{N-1}\hat{\phi}_{u,n} \qquad \text{(Equ. 21)}$$

In another embodiment, the output CPE is determined as:

$$\hat{\phi}_u = \angle\left(\sum_{n=1\ldots N-1}\sum_{m\in User\,U} r_m^H(n)\cdot r_m(n+1)\right) \qquad \text{(Equ. 22)}$$

After determination of the output CPE, the access point 210 determines a channel estimate using the output CPE to compensate for the carrier frequency offset, in various embodiments. The access point 210 removes or "cancels out" the corresponding training sequence (e.g., an HE-LTF training sequence) from a received signal $r_k(n)$ for each OFDM symbol of the long training field to obtain a received signal without the long training sequence:

$$y_k(n) = r_k(n) * HELTF_k, \; k = \text{data/pilot subcarriers,}$$
$$n = 1 \ldots N_{HELTF} \qquad \text{(Equ. 23)}$$

where $y_k(n)$ is the received signal with the HE-LTF sequence "removed" and $N_{HELTF}$ is an integer number of OFDM symbols of the training field. The result is then multiplied by the inverse of the P matrix to determine the channel estimate.

In an embodiment, the access point 210 estimates a channel matrix for the user u on subcarrier k, using estimated the device-specific CPE $\hat{\phi}_u$ as:

$$\hat{H}_{u,k} = [y_k(1)y_k(2)\ldots y_k(N_{HELTF})]\cdot \tilde{P}_u^{-1} \qquad \text{(Equ. 24)}$$

where $\tilde{P}$ is the equivalent P matrix with the device-specific CPE taken into account. The CPO is equal to $\hat{\phi}_u$ if the $i^{th}$ antenna belongs to the user u and thus:

$$\tilde{P} = \begin{bmatrix} P_{11} & P_{12}e^{j\phi_1} & \ldots & P_{1N}e^{j(N-1)\phi_1} \\ P_{21} & P_{22}e^{j\phi_2} & \ldots & P_{2N}e^{j(N-1)\phi_2} \\ \vdots & \vdots & \ldots & \vdots \\ P_{N1} & P_{N2}e^{j\phi_N} & \ldots & P_{NN}e^{j(N-1)\phi_N} \end{bmatrix}. \qquad \text{(Equ. 25)}$$

where, for clarity, N is the integer number $N_{HELTF}$ of OFDM symbols of the training field.

The access point 210 uses a matrix inversion method to determine the inverse of $\tilde{P}$, in various embodiments. In some scenarios, where the inter-user CPE is relatively small, such that $e^{j(\hat{\phi}_u - \hat{\phi}_v)} \approx 1$ for user u and v, the channel estimation equation can be simplified and evaluated as:

$$\hat{H}_{u,k} = [y_k(1)y_k(2)e^{-j\hat{\phi}_u}\ldots y_k(N_{HELTF})e^{-j\hat{\phi}_u(N_{HELTF}-1)}] \cdot$$
$$p_{(u)}^H \qquad \text{(Equ. 26)}$$

where the channel estimate for pilot subcarriers of the user u are taken from the first column of the matrix $\hat{H}_{u,k}$. In some embodiments where the client stations do not transmit on all pilot tones in the legacy preamble, the client station boosts a transmit power on the corresponding allocated pilot tones, while still meeting a spectrum mask. In one such embodiment, the channel estimation benefits from a higher SNR on the pilot tone and thus an improved CPE estimation.

FIG. 8A is a diagram of another data frame 800 that includes a reference field for concurrent transmission with other data frames to an access point, according to an embodiment. The data frame 800 includes a PHY preamble 810 and a data portion 812. The PHY preamble 810 includes a legacy portion 814 according to a proposed implementation of IEEE 802.11ax and a non-legacy portion 816. In the embodiment of FIG. 8, the legacy portion 814 includes the L-STF 322, the L-LTF 324, the L-SIG 326, and a high efficiency signal field (HE-SIGA) 728. The non-legacy portion 816 includes a high efficiency short training field (HE-STF) 730, a plurality of M high efficiency long training fields (HE-LTFs) 732, where M is an integer, and a second high efficiency signal field (HE-SIGB) 734. In the embodiment shown in FIG. 8A, the reference field is a CFO training field 829 which is inserted by the corresponding client station between the HE-SIGA 728 and the HE-STF field 730, similar to an additional HE-SIGA field. In some embodiments, the HE-SIGA field is not used and thus omitted by the client stations. In one such embodiment, the CFO training field 829 is inserted in place of the omitted HE-SIGA field and thus the CFO training field 829 is transmitted using repeated 20 MHz bands over the entire bandwidth of the MIMO communication channel. In an embodiment, the data frame 800 includes a non-legacy training field portion 840 that includes the CFO training field 829, the HE-STF 730, and the HE-LTFs 732.

FIG. 8B is a diagram of a data frame 850, analogous to the data frame 800, which includes the CFO training field 829, according to another embodiment. In the embodiment shown in FIG. 8B, the CFO training field 829 is inserted between the HE-STF field 730 and the first HE-LTF field 732-1. In an embodiment, the data frame 850 includes a non-legacy training field portion 890 that includes the CFO training field 829, the HE-STF 730, and the HE-LTFs 732. In some embodiments, the CFO training field 829 is transmitted using a tone spacing that is compatible with the IEEE 802.11ac standard. In other embodiments, the CFO training field is transmitted using ¼ tone spacing for HE. In an embodiment, the client station omits the HE-SIGA field 728.

In the embodiments shown in FIG. 8A and FIG. 8B, the CFO training field 829 is a dedicated OFDM symbol used for training and estimating the device-specific CFO. Although only a single OFDM symbol is shown in FIG. 8A and FIG. 8B, the CFO training field 829 includes additional OFDM symbols (e.g., 2, 3, etc.) in other embodiments and/or scenarios. In some embodiments, different client stations transmit in orthogonal tones which are allocated by the access point 210. In one such embodiment, the tones are equally allocated to different client stations across the bandwidth of the MIMO communication channel.

In some embodiments, the CFO training field 829 includes only a single OFDM symbol that is periodic within itself, similarly to a short training field, with an integer number of periods $N_p$. In a first scheme using a single OFDM symbol, the access point 210 allocates an integer number $M = N/N_p$ non-zero tones to the U different users. In the first scheme, a tone index is allocated to provide an interleaved allocation for each user u as:

$$u:m \bmod N_p, \; m = 0,1,2,\ldots N-1. \qquad \text{(Equ. 27)}$$

Figure 9:
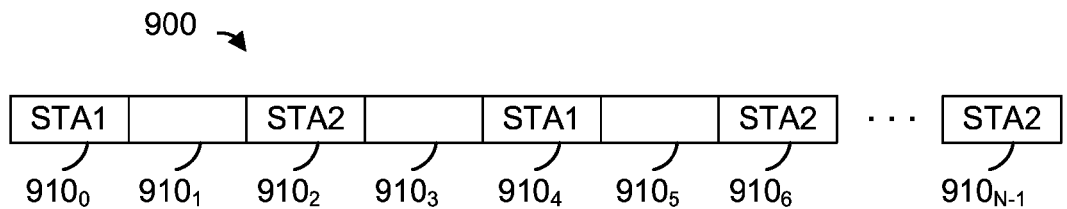
FIG. 9 is a diagram of an orthogonal frequency division multiplex (OFDM) symbol with an interleaved allocation to a plurality of communication devices, according to an embodiment.

FIG. 9 is a diagram of a periodic OFDM symbol 900 for the CFO training field 829 with an interleaved tone allocation to a plurality of communication devices, according to an embodiment. In the embodiment shown in FIG. 9, a first station STA1 is allocated tones 910-0, 910-4, etc. and a second station STA2 is allocated tones 910-2, 910-6, . . . 910-N−1 where N is the number of non-zero tones and $N_p$ is equal to four. Each client station populates a different training sequence to its corresponding allocated tones, in an embodiment. In another embodiment, two or more client stations share a training sequence. In various embodiments, the training sequence is selected to have a suitable peak to average power ratio (PAPR).

In a second scheme using a single OFDM symbol, the access point 210 allocates different time domain training sequences to the client stations. In this second scheme, the access point 210 selects the number of periods $N_p$ to be greater than the number of client stations and each client station uses a time domain sequence having a length $M=N/N_p$. In various embodiments, the training sequences are selected to have a suitably large auto-correlation and small cross correlation. In an embodiment, each client station uses a different time domain training sequence. In another embodiment, two or more client stations share a time domain training sequence, with subsequent client stations using a time domain shift $T_{shift}$ as $$T_{shift} = \frac{M*(u-1)}{U} \quad \text{(Equ. 28)}$$

Figure 10A:
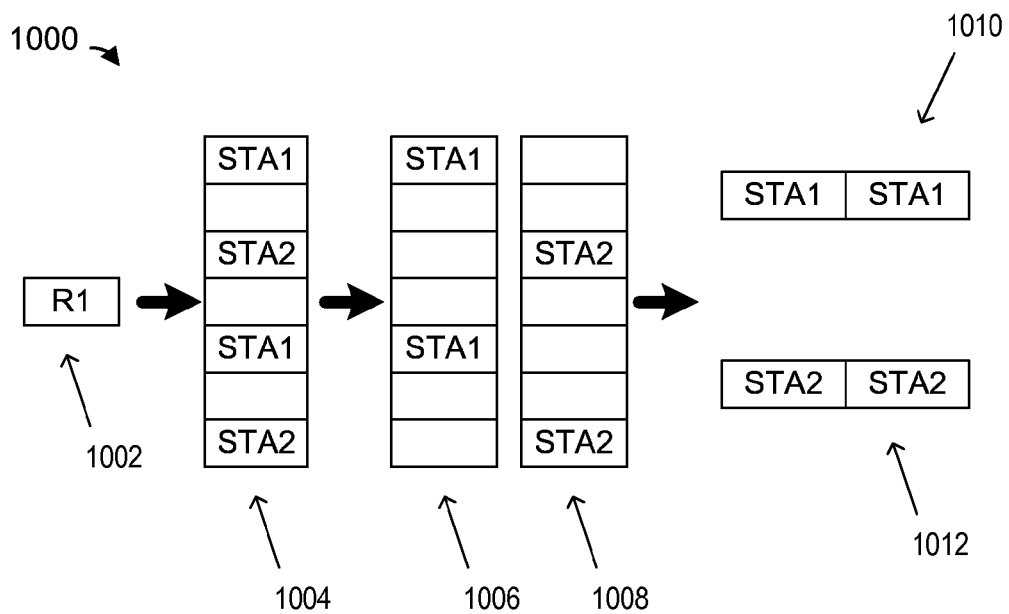
FIG. 10A is a diagram illustrating an example method for estimating a common phase error for a communication device with nulling of signals for other communication devices, according to an embodiment.

FIG. 10A is a diagram illustrating an example method 1000 for estimating a common phase error for a communication device with nulling of signals for other communication devices, according to an embodiment. In various embodiments, the access point 210 performs the method 1000 for estimating the device-specific CPE when using the single OFDM symbol 900 and the first scheme for tone allocation, as described above with reference to FIG. 9. In the method 1000, the access point 210 receives and performs an N-point fast Fourier transform (FFT) on a received periodic OFDM symbol 1002 to obtain a frequency domain signal 1004, in an embodiment. In an embodiment, N is an integer number of non-zero tones for the OFDM symbol 900. In the embodiment of FIG. 9, the periodic OFDM symbol 1002 includes frequency domain signals 1004 for a first client station STA1 and for a second client station STA2, where a number of periods $N_p$ is two and a number of non-zero tones is four. For each client station, the access point 210 nulls the non-zero tones from the frequency domain signals 1004 for the other client stations, in an embodiment. In the embodiment shown in FIG. 10A, the client station 210 i) nulls the non-zero tones corresponding to client station STA2 to obtain a nulled frequency domain signal 1006 for the first client station STA1, and ii) nulls the non-zero tones corresponding to client station STA1 to obtain a nulled frequency domain signal 1008 for the second client station STA2. The access point 210 performs an N-point inverse fast Fourier transform (IFFT) to obtain a time domain signal for each client station u as $$[y_1^u, y_2^u, \ldots, y_{N_p}^u] \quad \text{(Equ. 29)}$$

In the embodiment shown in FIG. 10A, the access point 210 i) performs an N-point IFFT on the nulled frequency domain signal 1006 to obtain a time domain signal 1010 corresponding to the client station STA1, and ii) performs an N-point IFFT on the nulled frequency domain signal 1008 to obtain a time domain signal 1012 corresponding to the client station STA2. In an embodiment, the access point 210 determines the device-specific CPE for each client station across each two periods through conjugate correlation as:

$$\hat{\phi}_n^u = \angle \left( \sum_{t=1}^{M} [y_n^u(t)]^H \cdot y_{n+1}^u(t+1) \right), n = 1 \ldots N_p - 1, M = \frac{N}{N_p} \quad \text{(Equ. 30)}$$

In some embodiments, the output CPE for the user u is averaged over the periods. In an embodiment, the access point 210 determines a linear average of the output CPE as:

$$\hat{\phi}^u = \frac{1}{N_p - 1} \sum_{n=1}^{N_p-1} \hat{\phi}_n^u \quad \text{(Equ. 31)}$$

In another embodiment, the access point 210 determines the output CPE as an averaged correlation:

$$\hat{\phi}^u = \angle \left( \sum_{n=1}^{N_p-1} \sum_{t=1}^{M} [y_n^u(t)]^H \cdot y_{n+1}^u(t+1) \right) \quad \text{(Equ. 32)}$$

Figure 10B:
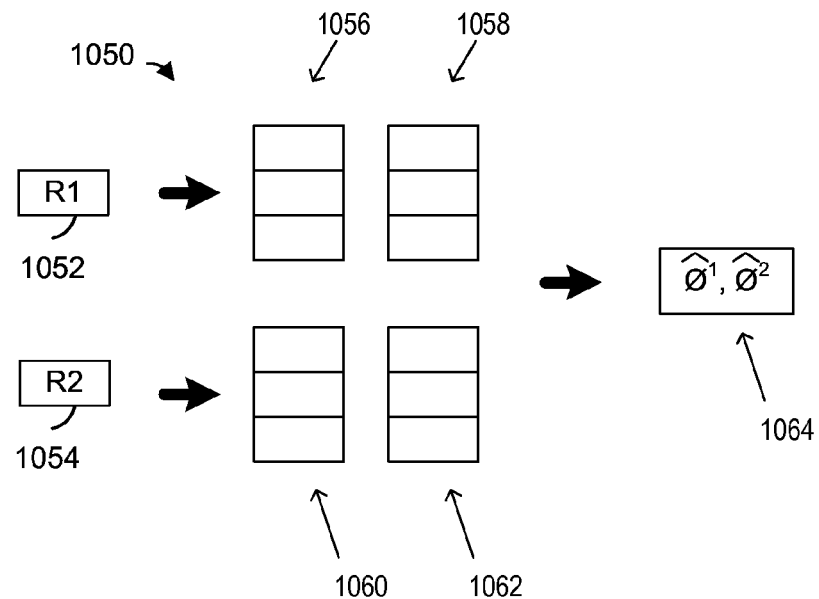
FIG. 10B is a diagram illustrating an example method for estimating a common phase error for a communication device with phase shifting, according to an embodiment.

FIG. 10B is a diagram illustrating an example method 1050 for estimating a common phase error for a communication device with phase shifting, according to an embodiment. In various embodiments, the access point 210 performs the method 1050 for estimating the device-specific CPE when using the single OFDM symbol 900 and the first scheme for tone allocation, as described above with reference to FIG. 9. The method 1050 includes an M-point FFT and phase shifting, where M is an integer equal to a number of non-zero tones for the OFDM symbols divided by the number of periods $N_p$. In an embodiment, the access point 210 determines a frequency domain tone value $y_{m,n}^u$ for each client station in each of the periods $N_p$. For example, in an embodiment, the access point 210 determines, for period n and client station u, a received value on tone m as:

$$y_{m,n}^u = \angle \left[ \sum_{t=1}^{M} \left( R_n(t) \cdot e^{-j\frac{2\pi}{M}tl} \right) \cdot W_M^{k,t} \right], \quad \text{(Equ. 33)}$$

$$m = kN_p + l(m \in \text{user } u), n = 1, \ldots, N_p - 1$$

which represents a scaled M-point FFT on a phase shifted version of a received signal $r_n(t)$, where $W_M^{k,t}$ represents the phase shift, k is equal to an integer floor of m divided by $N_p$, and l is equal to m mod $N_p$ such that m is a multiple of $N_p$ and a remainder l. As shown in FIG. 10B, the access point 210 performs the M-point FFT on i) a received signal 1052 (R1) and obtains a frequency domain tone value 1056 ($y_1^1$) and a frequency domain tone value 1058 ($y_1^2$), and ii) a received signal 1054 (R2) and obtains a frequency domain tone value 1060 ($y_2^1$) and a frequency domain tone value 1062 ($y_2^2$).

In an embodiment, the access point 210 determines the device-specific CPEs 1064 across each adjacent pair of periods through conjugate correlation as:

$$\hat{\phi}_n^u = N_P \angle \left( \sum_{m \in user\,u} [y_{m,n}^u]^H \cdot y_{m,n+1}^u \right), n = 1 \ldots N_p - 1 \quad \text{(Equ. 34)}$$

In some embodiments, the access point 210 determines the output CPE for a client station u as an average over the periods, as described above.

Figure 10C:
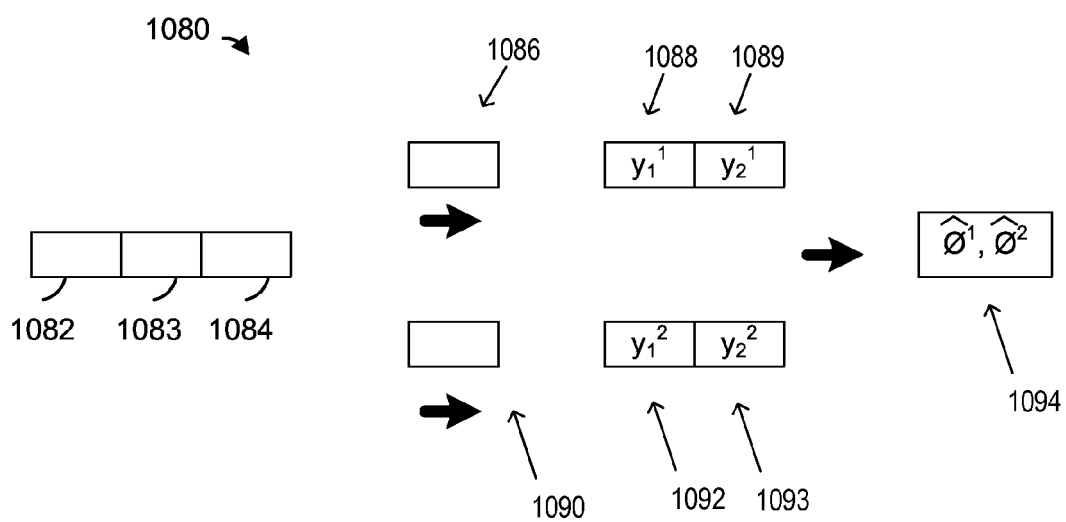
FIG. 10C is a diagram illustrating an example method for estimating a common phase error for a communication device with conjugate correlation, according to an embodiment.

FIG. 10C is a diagram illustrating an example method 1080 for estimating a common phase error for a communication device with conjugate correlation, according to an embodiment. In various embodiments, the access point 210 performs the method 1080 for estimating the device-specific CPE when using the single OFDM symbol 900 and the second scheme using a time domain training sequence, as described above with reference to FIG. 9. In an embodiment, each client station stores a template for determining the time domain training sequence. In another embodiment, each client station stores a set of predetermined time domain training sequences.

In an embodiment, the access point 210 determines a correlation value $y_n^u(t)$ of received signals r with templates $x(\tau)$ of each client station u as:

$$y_n^u(t) = \sum_{t=1}^{M} (\tau \geq t?) r_{n+1}(\tau - t) \cdot x(\tau) + (\tau < t?) r_n(M + \tau - t) \cdot x(\tau) \quad \text{(Equ. 35)}$$

where $1 \leq t < M$, $n = 1, \ldots N_p - 2$, $(\tau \geq t?)$ is equal to 1 if $\tau \geq t$ and 0 if $\tau < t$, and $(\tau < t?)$ is equal to 0 if $\tau \geq t$ and 1 if $\tau < t$. In the embodiment shown in FIG. 10C, the access point 210 determines a correlation value 1088 ($y_1^1$) and a correlation value 1089 ($y_2^1$) using template 1086 and determines a correlation value 1092 ($y_1^2$) and a correlation value 1093 ($y_2^2$) using template 1090.

The access point 210 determines the device-specific CPE across adjacent pairs of two periods through conjugate correlation as:

$$\hat{\phi}_n^u = N_P \angle \left( \sum_{m \in user\,u} [y_{m,n}^u]^H \cdot y_{m,n+1}^u \right), n = 1 \ldots N_p - 1 \quad \text{(Equ. 36)}$$

In some embodiments, the access point 210 determines the output CPE for a user u as an average over the periods (i.e., a linear average or averaged correlation), as described above.

In other embodiments, the CFO training field 829 includes multiple OFDM symbols with a same training sequence. In various embodiments for a first scheme using multiple OFDM symbols, the access point 210 allocates orthogonal tones to different users and each user u uses a same frequency domain training sequence of length $$\left\lfloor \frac{N}{U} \right\rfloor,$$

where N is a total number of non-zero tones and U is the total number of users (i.e., client stations). In an embodiment, the access point 210 uses an interleaved allocation of tones for the first scheme. In another embodiment, the access point 210 uses a block allocation of tones for the first scheme. In an embodiment, the frequency domain training sequence is a sequence having a suitable PAPR and is populated to the corresponding allocated tones by the client stations.

Figure 11A:
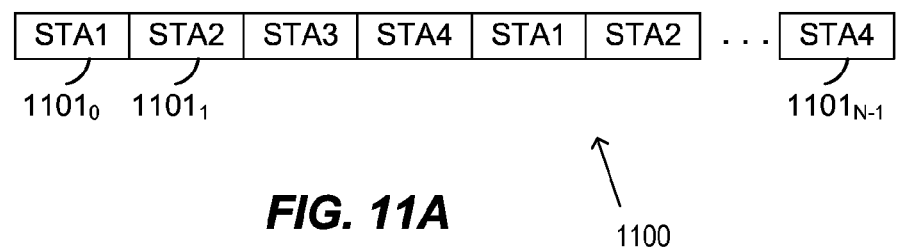
FIG. 11A is a diagram illustrating OFDM symbols with an alternating allocation of tones, according to an embodiment.

FIG. 11A is a diagram illustrating OFDM symbols with an interleaved allocation 1100 of tones for the first scheme, according to an embodiment. In an embodiment, the access point 210 determines the interleaved allocation 1100 for each user u as:

$$u{:}m \bmod U, m = 0, 1, \ldots N-1. \quad \text{(Equ. 37)}$$

In the embodiment shown in FIG. 11A, the access point 210 allocates 52 non-zero tones 1101 across four client stations (STA1, STA2, STA3, and STA4) such that each client station is allocated 13 interleaved tones.

Figure 11B:
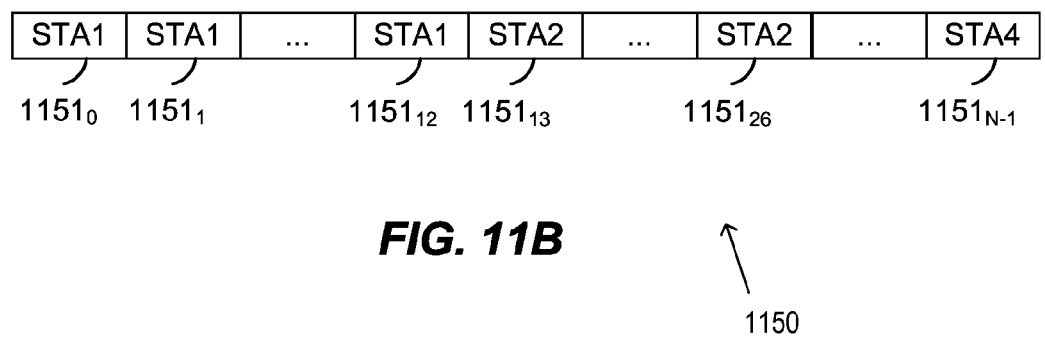
FIG. 11B is a diagram illustrating OFDM symbols with a block allocation of tones, according to another embodiment.

FIG. 11B is a diagram illustrating OFDM symbols with a block allocation 1150 of tones for the first scheme, according to another embodiment. In an embodiment, the access point 210 determines the block allocation 1150 for each user u as:

$$u{:} \left\lfloor \frac{N}{U} \right\rfloor \cdot (u-1) \leq m \leq \left\lfloor \frac{N}{U} \right\rfloor \cdot (u) \quad \text{(Equ. 38)}$$

In the embodiment shown in FIG. 11B, the access point 210 allocates 52 non-zero tones 1151 for an IEEE 802.11ac communication channel across four client stations (STA1, STA2, STA3, and STA4) such that each client station is allocated a block that includes 13 tones (i.e., tones 0 to 12, tones 13 to 25, tones 26 to 38, and tones 39 to 51). In other embodiments, some client stations have an unequal number of tones in their corresponding tone block, for example, when 52 non-zero tones are divided across three client stations, 5 client stations, etc.

Using the first scheme, the access point 210 estimates the device-specific CPE directly from received signals. In an embodiment, after performing an N-point FFT of each received signal, the access point 210 estimates the device-specific CPE per OFDM symbol n of client station u as:

$$\hat{\phi}_{u,n} = \angle \left( \sum_{m \in User\,u} y_m^H(n) \cdot y_m(n+1) \right), n = 1 \ldots L - 1 \quad \text{(Equ. 39)}$$

where m is an integer index of allocated tones for the user u, L is an integer number of OFDM symbols of the CFO training field 829, and $y_m(n)$ is the received signal vector on tone m of the $n^{th}$ OFDM symbol.

In some embodiments, the access point 210 averages the output CPE for user u over the OFDM symbols of the CPO training field 829. In one such embodiment, the access point 210 determines the output CPE as a linear average:

$$\hat{\phi}_u = \frac{1}{L-1} \sum_{n=1}^{L-1} \hat{\phi}_{u,n} \quad \text{(Equ. 40)}$$

In another embodiment, the access point 210 determines the output CPE as an averaged correlation:

$$\hat{\phi}_u = \angle \left( \sum_{n=1 \ldots L-1} \sum_{m \in User\,U} y_m^H(n) \cdot y_m(n+1) \right) \quad \text{(Equ. 41)}$$

After the determination of the output CPE, the access point 210 performs a channel estimation based on the output CPE, as described above.

Using the second scheme with multiple OFDM symbols, the access point 210 allocates different time domain training sequences to different users, in various embodiments. In a similar manner as having only a single OFDM symbol for the CFO training field 829 as described above, the access point 210 uses a correlation-based method for multiple OFDM symbols to estimate the CFO, in various embodiments. In various embodiments of the second scheme, the number of time domain training sequences is larger than two. For example, in an embodiment, a set of U sequences of length N is used where U is an integer number of client stations. In various embodiments, the time domain training sequences are selected to have a suitably large auto-correlation and small cross correlation. In an embodiment, each client station uses a different time domain training sequence. In another embodiment, two or more client stations share a time domain training sequence, with subsequent client stations using a time shift $T_{shift}$ as:

$$T_{shift} = \frac{N*(u-1)}{U} \quad \text{(Equ. 42)}$$

For CFO estimation with multiple OFDM symbols, each client station stores a template for the time domain training sequence, in an embodiment. The access point 210 determines a correlation of a received signal r with the template of the corresponding client station. For a client station u, period n, and time index t, the correlated value is:

$$y_n^u(t) = \sum_{t=1}^{M} (\tau \geq t?)r_{n+1}(\tau-t) \cdot x(\tau) + (\tau<t?)r_n(M+\tau-t) \cdot x(\tau) \quad \text{(Equ. 43)}$$

where $1 \leq t < M$, $n=1, \ldots L-2$, $(\tau \geq t?)$ is equal to 1 if $\tau \geq t$ and 0 if $\tau < t$, and $(\tau < t?)$ is equal to 0 if $\tau \geq t$ and 1 if $\tau < t$. In an embodiment, the access point 210 determines the device-specific CPE across adjacent periods through conjugate correlation as:

$$\hat{\phi}_n^u = N_p \angle \left( \sum_{m \in user\, u} [y_n^u]^H \cdot y_{n+1}^u \right), n = 1 \ldots N_p - 2 \quad \text{(Equ. 44)}$$

In some embodiments, the access point 210 averages the device-specific CPE for the client station u over the periods. In an embodiment, the access point 210 determines a linear average of the output CPE as:

$$\hat{\phi}_u = \frac{1}{L-2} \sum_{n=1}^{L-2} \hat{\phi}_{u,n} \quad \text{(Equ. 45)}$$

In another embodiment, the output CPE is determined as:

$$\hat{\phi}_u = \angle \left( \sum_{n=1\ldots L-2} \sum_{m \in User\, U} y_m^H(n) \cdot y_m(n+1) \right) \quad \text{(Equ. 46)}$$

For the frequency domain training symbol design, each user is not transmitting on all tones in each OFDM symbol. In an embodiment, the client station keeps the same per-tone transmit power as regular OFDM symbols to avoid potential "power burp" or clipping after automatic gain control procedures for the STF. In another embodiment, the client station boosts the transmit power on its allocated tones to keep the same per symbol power, within limits of a spectrum mask. In an embodiment, the power boost value is the number of users U or the ratio between the total number of tones and the number of allocated tones. The device-specific CPE and/or CFO estimation can potentially benefit from higher SNR on the allocated tones.

Referring again to FIG. 3, in various embodiments, the access point 210 continues to track the CFO in the OFDM symbols of the VHT-SIGB 334 and data portion 312 using the corresponding pilot tones. In an embodiment, for each received OFDM symbol of the VHT-SIGB 334 and data portion 312, the access point 210 tracks the CFO based on a current channel estimate for a received OFDM symbol and a reference channel estimate determined for a previously received OFDM symbol of the non-legacy training field portion 340. In some embodiments, the access point 210 uses the updated CFO and/or device-specific CPE value for data detection and/or further CFO compensation. In various embodiments, the access point 210 allocates the pilot tones for the VHT-SIGB 334 and data portion 312 using an overlapped allocation, a fixed non-overlapped allocation, or an interleaved non-overlapped allocation.

In an embodiment, the overlapped allocation is based on the tone allocation defined in the IEEE 802.11ac standard, for example, all pilot tones are allocated to every client station for the simultaneous transmission. In this embodiment, the access point 210 equalizes a received signal on a pilot tone in a similar way as a data tone using channel estimation from a VHT-LTF field as:

$$y_{u,m} = g_u^H \cdot r_m \quad \text{(Equ. 47)}$$

where $g_u$ is an equalizer (e.g., a minimum mean square error) for the user u, based on the channel estimation in the VHT-LTF field. In this embodiment, the access point 210 estimates the device-specific CPE for user u as:

$$\hat{\phi}u = \angle(y_u^H \cdot s_u) \quad \text{(Equ. 48)}$$

where $y_u^H$ is the equalized vector for all pilot tones and $s_u$ is the transmitted pilot vector. In some embodiments, the access point 210 uses the estimated device-specific CPE to compensate the data portion 312 to assist data detection for a current OFDM symbol or CFO compensation for a subsequent OFDM symbol.

In another embodiment, the access point 210 uses a fixed non-overlapped allocation. For example, in an embodiment, the access point 210 allocates pilot tones to a client station u as $$u = m \bmod U, \; m=0,1,2, \ldots N_{pilot}-1 \quad \text{(Equ. 49)}$$

In this embodiment, for each pilot tone m, only the corresponding client station transmits a signal using a same pilot polarity as defined in the IEEE 802.11ac standard. Although the fixed non-overlapped allocation can be used for joint, staggered, and mixed channel estimation as described above with reference to FIGS. 4A, 4B, and 4C, some client stations may not be treated equally in that they have a different number of pilot tones when the number of client stations U is less than the number of pilot tones $N_{pilot}$. For the fixed non-overlapped allocation, the access point 210 estimates the device-specific CPE for a user u, on each assigned pilot tone m, as $$\hat{\phi}_{u,m} = \angle(h_{u,m}^H \cdot r_m \cdot s_{u,m}) \quad \text{(Equ. 50)}$$

where $$h_{u,m}^H = \left[ \sum_{i(u)=1}^{N_T^u} h_{i(u),0}^m \sum_{i(u)=1}^{N_T^u} h_{i(u),1}^m \cdots \sum_{i(u)=1}^{N_T^u} h_{i(u),N_R}^m \right] \quad \text{(Equ. 51)}$$

where $h_{i,j}^m$ is the channel estimate for pilot tone m from transmit antenna i to receive antenna j, $N_T^u$ is the number of transmit antennas for user u, and $N_R$ is the number of receive antenna of the access point 210. In some embodiments, the access point 210 estimates the output CPE as:

$$\hat{\phi}_u = \angle\left(\sum_{m \in User_u} h_{u,m}^H \cdot r_m \cdot s_{u,m}\right) \quad \text{(Equ. 52)}$$

In yet another embodiment, the access point 210 uses an interleaved non-overlapped allocation. For example, in an embodiment, the access point 210 allocates pilot tones to a client station u as $$u=(m+n)\bmod U,\ m=0,1,2,\ldots N_{pilot}-1,\ n=0,1,\ldots N_{DATA}-1 \quad \text{(Equ. 53)}$$

for pilot tone m on the $n^{th}$ OFDM symbol of the data portion 312, where only the corresponding client station transmits a signal on a pilot tone using a same pilot polarity as defined in IEEE 802.11ac. In an embodiment, the access point 210 allocates tones according to the interleaved non-overlapped allocation for the staggered transmission, as described above with respect to FIG. 4B. In this embodiment, each client station takes the pilot tones in turn and an equal number of pilot tones are used by the client stations for every U OFDM symbols. For the interleaved non-overlapped allocation, the access point 210 estimates the device-specific CPE similarly to the fixed non-overlapped allocation as described above, using the corresponding pilot tones for each user on each OFDM symbol of the data portion 312.

After estimating the device-specific CPE for one or more OFDM symbols of a data frame for a client station, the access point 210 determines the CFO for the corresponding client station u as $$\Delta \hat{f}_u = \frac{\hat{\phi}_u}{(2\pi \cdot T_S)} \quad \text{(Equ. 54)}$$

In some embodiments, the access point 210 uses the CFO to perform CFO compensation in the time domain for subsequent OFDM symbols. In an embodiment, the access point 210 has a single processor configured to perform CFO compensation and in this case, the device-specific CFOs are used to refine the common CFO estimation obtained from the legacy portion of the preamble, as described above with respect to FIG. 7. In an embodiment, the access point 210 determines the common CFO as a function of each of the determined device-specific CFO estimates, $\Delta f = f(\Delta \hat{f}_i)$. In one such embodiment, the access point 210 uses an average of the device-specific CFOs:

$$\Delta f = \frac{1}{N_{STS}} \sum_i \Delta \hat{f}_i \quad \text{(Equ. 55)}$$

In some embodiments, the access point 210 has a plurality of separate or parallel processors configured to perform CFO compensation for each client station. In one such embodiment, a larger maximum difference between CFOs of the client stations can be tolerated with suitable performance.

FIG. 12 is a flow diagram of an example method 1200 for compensating for a carrier frequency offset, according to an embodiment. With reference to FIG. 1, the method 1200 is implemented by the network interface 16, in an embodiment. For example, in one such embodiment, the PHY processing unit 20 is configured to implement the method 1200. With continued reference to FIG. 1, in yet another embodiment, the method 1200 is implemented by the network interface 27 (e.g., the PHY processing unit 29). In other embodiments, the method 1200 is implemented by other suitable network interfaces.

At block 1202, a first communication device, such as the access point 210, receives a plurality of data frames via a multiple input, multiple output (MIMO) communication channel, in an embodiment. In an embodiment, the plurality of data frames are transmitted simultaneously from respective ones of a plurality of second communication devices. For example, in an embodiment, a plurality of client stations 25 transmit the plurality of data frames.

At block 1204, the first communication device estimates a common carrier frequency offset (CFO) that is common to each of the plurality of data frames based on a legacy portion of a physical layer (PHY) preamble of each of the plurality of data frames, in an embodiment.

At block 1206, the first communication device compensates each of the plurality of data frames based on the common CFO, in an embodiment. For example, in an embodiment, the first communication device determines a channel estimate using the common CFO to compensate for the carrier frequency offset.

At block 1208, the first communication device estimates respective device-specific CFOs for channel estimation of the MIMO communication channel based on pilot tones of respective non-legacy training field portions of the plurality of data frames, in an embodiment. In some embodiments, the pilot tones have a non-overlapping allocation to the plurality of second communication devices, such as, for example, the interleaved allocation 1100 or block allocation 1150 as described above with reference to FIG. 11A and FIG. 11B, respectively. Each device-specific CFO is specific to the corresponding second communication device of the plurality of second communication devices, in an embodiment.

At block 1210, the first communication device compensates the respective non-legacy training field portions based on the corresponding device-specific CFO. For example, in an embodiment, the first communication device determines a channel estimate using the device-specific CFO to compensate for the carrier frequency offset. In some embodiments, the device-specific CFO is a linear average or averaged correlation, as described above.

Figure 13:
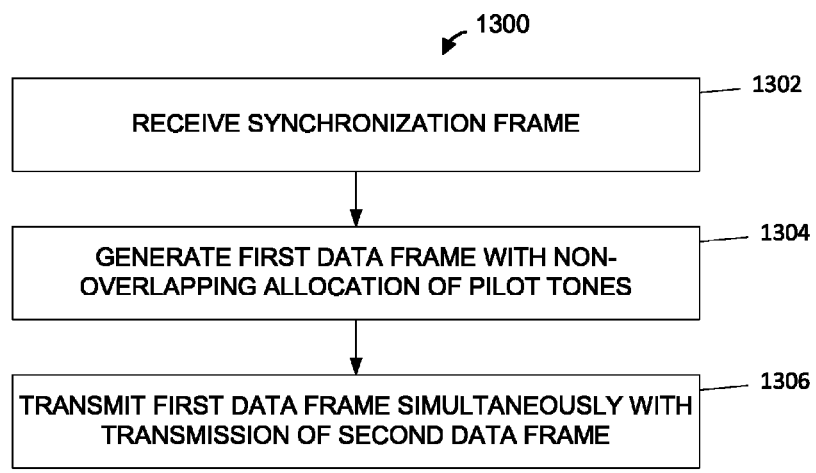
FIG. 13 is a flow diagram of an example method for transmitting a data frame, according to an embodiment.

FIG. 13 is a flow diagram of an example method 1300 for transmitting a data frame with a non-overlapping allocation of pilot tones, according to an embodiment. With reference to FIG. 1, the method 1300 is implemented by the network interface 16, in an embodiment. For example, in one such embodiment, the PHY processing unit 20 is configured to implement the method 1300. With continued reference to FIG. 1, in yet another embodiment, the method 1300 is implemented by the network interface 27 (e.g., the PHY processing unit 29). In other embodiments, the method 1300 is implemented by other suitable network interfaces.

At block 1302, a first communication device receives a synchronization frame from a second communication device, in an embodiment. In some embodiments, the first communication device is a client station 25 and the second communication device is an access point 210. The synchronization frame has an allocation indicator that indicates a non-overlapping allocation of pilot tones, in an embodiment. For example, in an embodiment, the non-overlapping allocation of pilot tones is the block allocation 600 or interleaved allocation 650, as described above with respect to FIGS. 6A and 6B, respectively.

At block 1304, the first communication device generates a first data frame that comprises a plurality of OFDM symbols of a non-legacy training field portion, in an embodiment. The plurality of OFDM symbols include only pilot tones corresponding to the non-overlapping allocation of pilot tones, in an embodiment.

At block 1306, the first communication device transmits, in response to the synchronization frame and via a MIMO communication channel, the first data frame to the second communication device simultaneously with a transmission of a second data frame by a third communication device via the MIMO communication channel, in an embodiment. Corresponding OFDM symbols of respective non-legacy training field portions of the first data frame and the second data frame include non-overlapping pilot tones according to the non-overlapping allocation, in an embodiment.

Figure 14:
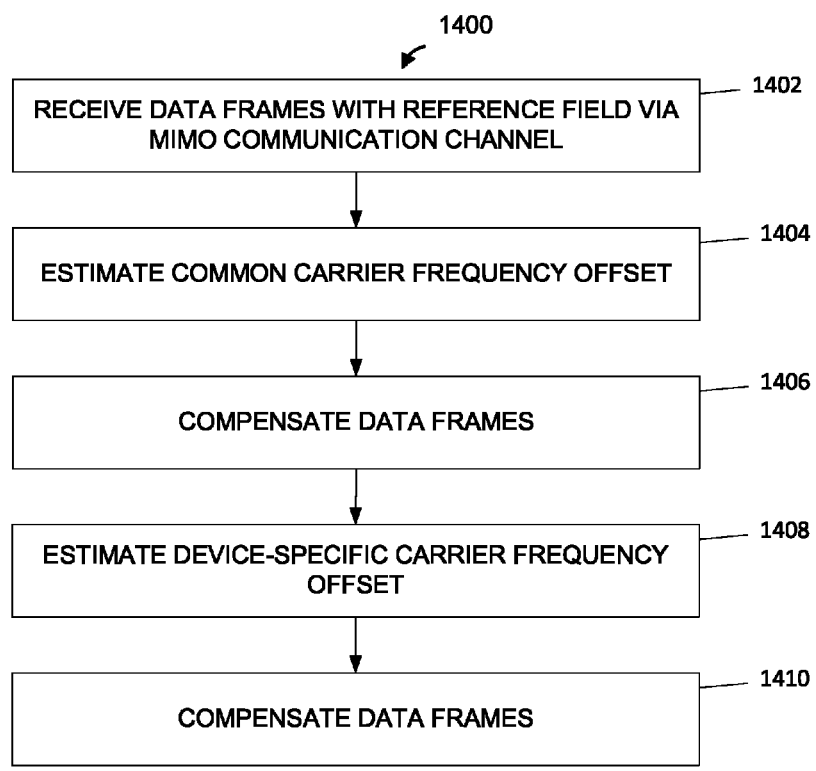
FIG. 14 is a flow diagram of an example method for compensating for a carrier frequency offset, according to an embodiment.

FIG. 14 is a flow diagram of an example method 1400 for compensating for a carrier frequency offset, according to an embodiment. With reference to FIG. 1, the method 1400 is implemented by the network interface 16, in an embodiment. For example, in one such embodiment, the PHY processing unit 20 is configured to implement the method 1400. With continued reference to FIG. 1, in yet another embodiment, the method 1400 is implemented by the network interface 27 (e.g., the PHY processing unit 29). In other embodiments, the method 1400 is implemented by other suitable network interfaces.

At block 1402, a first communication device receives a plurality of data frames via a multiple input, multiple output (MIMO) communication channel, in an embodiment. The plurality of data frames are transmitted simultaneously from respective ones of a plurality of second communication devices, in an embodiment. For example, in an embodiment, a plurality of client stations 25 transmit the plurality of data frames. In some embodiments, block 1402 also includes receiving a respective non-legacy training field portion of a PHY preamble for each of the plurality of data frames, where each non-legacy training field portion having i) a reference field, ii) a short training field, and iii) at least one long training field. In an embodiment, the non-legacy training field portion is the non-legacy training field portion 540, as described above with respect to FIG. 5. In an embodiment, one or more of the plurality of data frames is the data frame 800 or 850, as described above with respect to FIG. 8A and FIG. 8B, respectively.

At block 1404, the first communication device estimates a common CFO that is common to each of the plurality of data frames based on a legacy portion of the PHY preamble of each of the plurality of data frames, in an embodiment.

At block 1406, the first communication device compensates each of the plurality of data frames based on the common CFO, in an embodiment.

At block 1408, the first communication device estimates respective device-specific CFOs for channel estimation of the MIMO communication channel based on pilot tones of the corresponding reference field after compensating each of the plurality of data frames, in an embodiment. In some embodiments, the pilot tones have a non-overlapping allocation to the plurality of second communication devices, such as, for example, the interleaved allocation 1100 or block allocation 1150 as described above with reference to FIG. 11A and FIG. 11B, respectively. Each device-specific CFO is specific to the corresponding second communication device of the plurality of second communication devices, in an embodiment.

At block 1410, the first communication device compensates the plurality of data frames based on the corresponding device-specific CFO, in an embodiment. For example, in an embodiment, the first communication device determines a channel estimate using the device-specific CFO to compensate for the carrier frequency offset. In some embodiments, the device-specific CFO is a linear average or averaged correlation, as described above.

Figure 15:
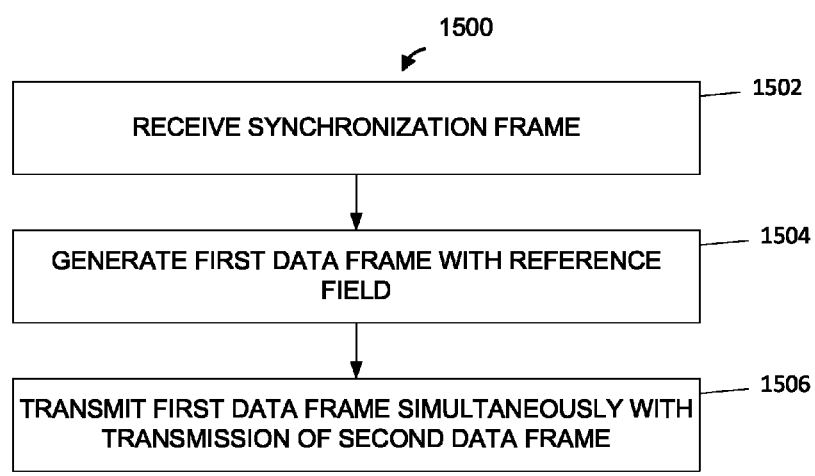
FIG. 15 is a flow diagram of an example method for transmitting a data frame, according to an embodiment.

FIG. 15 is a flow diagram of an example method 1500 for transmitting a data frame, according to an embodiment. With reference to FIG. 1, the method 1500 is implemented by the network interface 16, in an embodiment. For example, in one such embodiment, the PHY processing unit 20 is configured to implement the method 1500. With continued reference to FIG. 1, in yet another embodiment, the method 1500 is implemented by the network interface 27 (e.g., the PHY processing unit 29). In other embodiments, the method 1500 is implemented by other suitable network interfaces.

At block 1502, a first communication device receives a synchronization frame from a second communication device, in an embodiment. In some embodiments, the first communication device is a client station 25 and the second communication device is an access point 210.

At block 1504, the first communication device generates a first data frame such that a non-legacy training field portion of a PHY preamble for the first data frame includes: i) a reference field, ii) a short training field, and iii) at least one long training field, in an embodiment. In an embodiment, the non-legacy training field portion is the non-legacy training field portion 540, as described above with respect to FIG. 5. In an embodiment, one or more of the plurality of data frames is the data frame 800 or 850, as described above with respect to FIG. 8A and FIG. 8B, respectively.

At block 1506, the first communication device transmits via a MIMO communication channel, in response to the synchronization frame, the first data frame to the second communication device simultaneously with a transmission of a second data frame by a third communication device via the MIMO communication channel, in an embodiment. In an embodiment, the third communication device is another client station 25.

Figure 16:
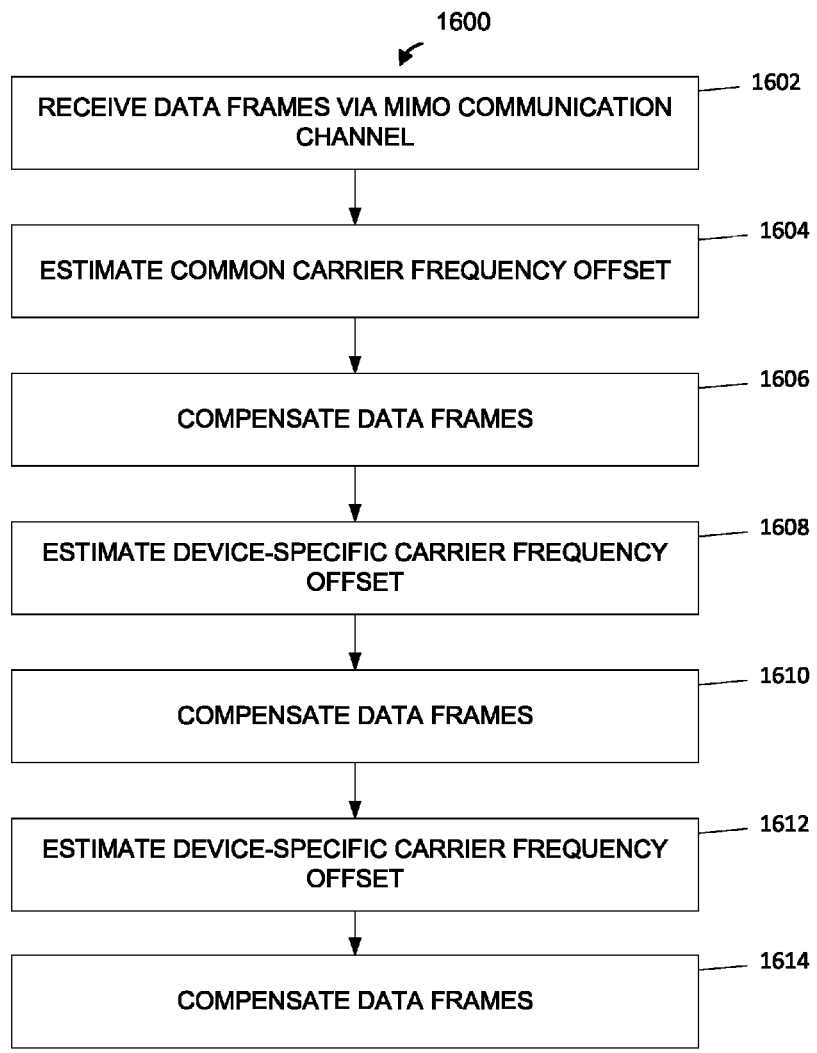
FIG. 16 is a flow diagram of an example method for compensating for a carrier frequency offset, according to an embodiment.

FIG. 16 is a flow diagram of an example method 1600 for compensating for a carrier frequency offset, according to an embodiment. With reference to FIG. 1, the method 1600 is implemented by the network interface 16, in an embodiment. For example, in one such embodiment, the PHY processing unit 20 is configured to implement the method 1600. With continued reference to FIG. 1, in yet another embodiment, the method 1600 is implemented by the network interface 27 (e.g., the PHY processing unit 29). In other embodiments, the method 1600 is implemented by other suitable network interfaces.

At block 1602, a first communication device receives a plurality of data frames via a MIMO communication channel, in an embodiment. The plurality of data frames are transmitted simultaneously from respective ones of a plurality of second communication devices, in an embodiment. In some embodiments, the plurality of second communication devices are client stations 25.

At block 1604, the first communication device estimates a common CFO that is common to each of the plurality of data frames based on a legacy portion of the PHY preamble of each of the plurality of data frames, in an embodiment.

At block 1606, the first communication device compensate each of the plurality of data frames based on the common CFO, in an embodiment.

At block 1608, the first communication device estimates respective first device-specific CFOs for channel estimation of the MIMO communication channel based on pilot tones of respective non-legacy training field portions of the plurality of data frames after compensating each of the plurality of data frames, in an embodiment. In some embodiments, the pilot tones have a non-overlapping allocation to the plurality of second communication devices, such as, for example, the interleaved allocation 1100 or block allocation 1150 as described above with reference to FIG. 11A and FIG. 11B, respectively. Each first device-specific CFO is specific to the corresponding second communication device of the plurality of second communication devices, in an embodiment.

At block 1610, the first communication device compensates the plurality of data frames based on the corresponding device-specific CFO, in an embodiment. In an embodiment, each of the plurality of data frames comprises a respective data portion having a plurality of OFDM symbols.

At block 1612, the first communication device estimates respective second device-specific CFOs for channel estimation of the MIMO communication channel based on a current OFDM symbol of the plurality of OFDM symbols and the first device-specific CFO, in an embodiment.

At block 1614, the first communication device compensates the plurality of data frames based on the corresponding second device-specific CFO, in an embodiment.

Figure 17:
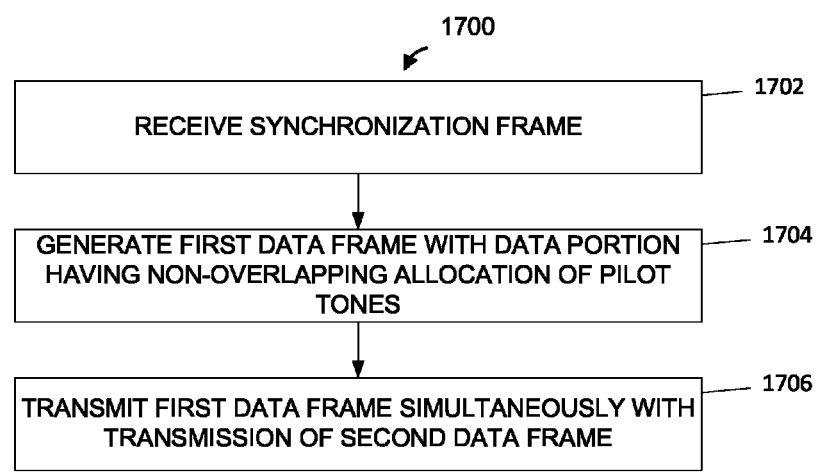
FIG. 17 is a flow diagram of an example method for transmitting a data frame, according to an embodiment.

FIG. 17 is a flow diagram of an example method 1700 for transmitting a data frame, according to an embodiment. With reference to FIG. 1, the method 1700 is implemented by the network interface 16, in an embodiment. For example, in one such embodiment, the PHY processing unit 20 is configured to implement the method 1700. With continued reference to FIG. 1, in yet another embodiment, the method 1700 is implemented by the network interface 27 (e.g., the PHY processing unit 29). In other embodiments, the method 1700 is implemented by other suitable network interfaces.

At block 1702, a first communication device receives, from a second communication device, a synchronization frame having an allocation indicator that indicates a non-overlapping allocation of pilot tones, in an embodiment. In some embodiments, the first communication device is a client station 25 and the second communication device is an access point 210.

At block 1704, the first communication device generates a first data frame that comprises a plurality of OFDM symbols of a data portion, in an embodiment. The plurality of OFDM symbols includes only pilot tones corresponding to the non-overlapping allocation of pilot tones, in an embodiment.

At block 1706, the first communication device transmits, in response to the synchronization frame and via a MIMO communication channel, the first data frame to the second communication device simultaneously with a transmission of a second data frame by a third communication device via the MIMO communication channel, in an embodiment. Corresponding OFDM symbols of respective non-legacy training field portions of the first data frame and the second data frame include non-overlapping pilot tones according to the non-overlapping allocation, in an embodiment.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for use in a communication network, the method comprising:
   receiving, at a first communication device, a plurality of data frames via a multiple input, multiple output (MIMO) communication channel, wherein the plurality of data frames are transmitted simultaneously from respective ones of a plurality of second communication devices;
   estimating, by the first communication device, a common carrier frequency offset (CFO) that is common to each of the plurality of data frames based on a legacy portion of a physical layer (PHY) preamble of each of the plurality of data frames; and
   compensating, by the first communication device, each of the plurality of data frames based on the common CFO;
   estimating, by the first communication device, respective device-specific CFOs for channel estimation of the MIMO communication channel based on pilot tones of respective non-legacy training field portions of the plurality of data frames, the pilot tones having a non-overlapping allocation to the plurality of second communication devices, wherein each device-specific CFO is specific to the corresponding second communication device of the plurality of second communication devices;
   compensating, by the first communication device, the respective non-legacy training field portions based on the corresponding device-specific CFO.

2. The method of claim 1, wherein estimating the common CFO comprises determining an autocorrelation phase for a legacy short training field of the legacy portion for each of the plurality of data frames.

3. The method of claim 1, wherein estimating the common CFO comprises determining a time domain phase difference between adjacent orthogonal frequency division multiplexing (OFDM) symbols of a legacy long training field of the legacy portion for each of the plurality of data frames.

4. The method of claim 1, wherein estimating the common CFO comprises estimating a phase difference between pilot tones of the MIMO communication channel for i) a legacy long training field of the legacy portion, and ii) one of a legacy signal field of the legacy portion that is after and adjacent to the legacy long training field, a first OFDM symbol of a non-legacy signal field that is after and adjacent to the legacy signal field, or a second OFDM symbol of the non-legacy signal field that is after and adjacent to the first OFDM symbol.

5. The method of claim 1, wherein:
compensating each of the plurality of data frames based on the common CFO comprises compensating each of the plurality of data frames in a time domain after estimating the common CFO.

6. The method of claim 5, wherein:
receiving the plurality of data frames comprises simultaneously receiving a respective plurality of OFDM symbols of the corresponding non-legacy training field portion of the plurality of data frames; and
estimating the respective device-specific CFO comprises:
estimating a device common phase error (CPE) per OFDM symbol of the corresponding plurality of OFDM symbols,
determining an average of the device-specific CPE for the corresponding plurality of OFDM symbols, and
estimating a channel matrix for the MIMO communication channel based on the average of the device-specific CPE for the corresponding plurality of OFDM symbols.

7. The method of claim 6, wherein the method further comprises:
determining the non-overlapping allocation for the plurality of second communication devices, and
sending a synchronization frame to the plurality of second communication devices, the synchronization frame having an allocation indicator that corresponds to the determined non-overlapping allocation.

8. The method of claim 7, wherein determining the non-overlapping allocation comprises allocating a larger number of pilot tones to a first device of the plurality of second communication devices as compared to a second device of the plurality of second communication devices where the first device has a lower signal to noise ratio than the second device.

9. The method of claim 5, wherein:
receiving the plurality of data frames comprises sequentially receiving a plurality of OFDM symbols of the corresponding non-legacy training field portion of the plurality of data frames, wherein each of the plurality of OFDM symbols corresponds to a single communication device of the plurality of second communication devices; and
estimating the respective device-specific CFO comprises:
estimating a device-specific CPE per OFDM symbol of the plurality of OFDM symbols,
determining an average of the device-specific CPE for the plurality of OFDM symbols, and
estimating a channel matrix for the MIMO communication channel based on the average of the device-specific CPE for the plurality of OFDM symbols.

10. The method of claim 5, wherein receiving the plurality of data frames comprises:
simultaneously receiving a first plurality of OFDM symbols of the non-legacy training field portion of the plurality of data frames including pilot tones, wherein the pilot tones in the first plurality of OFDM symbols have a non-overlapping allocation to the plurality of second communication devices; and
sequentially receiving a second plurality of OFDM symbols of the non-legacy training field portion, wherein each of the second plurality of OFDM symbols corresponds to a single communication device of the plurality of second communication devices.

11. The method of claim 5, wherein:
receiving the plurality of data frames comprises simultaneously receiving a respective first plurality of OFDM symbols of the non-legacy training field portion for each of the plurality of data frames including first pilot tones, wherein each of the plurality of second communication devices simultaneously transmits the corresponding first plurality of OFDM symbols with same first pilot tones;
the method further comprises estimating a channel matrix for the MIMO communication channel based on the respective first pluralities of OFDM symbols;
receiving the plurality of data frames further comprises simultaneously receiving a respective second plurality of OFDM symbols of a data portion for each of the plurality of data frames including second pilot tones, wherein the second pilot tones in the respective second pluralities of OFDM symbols have an interleaved and non-overlapping allocation to the plurality of second communication devices; and
estimating the respective device-specific CFO comprises:
estimating a respective device-specific CPE per OFDM symbol of the corresponding second plurality of OFDM symbols,
determining an average of the device-specific CPEs for the corresponding second communication device, and
estimating a channel matrix for the MIMO communication channel based on the average of the device-specific CPEs for the corresponding second communication device.

12. The method of claim 1, wherein:
estimating the common CFO comprises determining a time domain phase difference between adjacent OFDM symbols of a legacy long training field of the legacy portion for each of the plurality of data frames;
the method further comprises:
estimating a respective device-specific CFO for at least one data frame of the plurality of data frames after compensating each of the plurality of data frames, wherein each device-specific CFO is specific to the corresponding second communication device of the plurality of second communication devices, and
compensating the at least one data frame based on the corresponding device-specific CFO; and
estimating the respective device-specific CFO comprises:
estimating the device-specific CFO based on pilot tones in i) a legacy long training field of the legacy portion, ii) a legacy signal field of the legacy portion that is after and adjacent to the legacy long training field, iii) a first OFDM symbol of a non-legacy signal field that is after and adjacent to the legacy signal field, or iv) a second OFDM symbol of the non-legacy signal field that is after and adjacent to the first OFDM symbol, wherein the pilot tones are alternately allocated to the plurality of second communication devices.

13. A method for use in a communication network, the method comprising:
receiving, at a first communication device, a plurality of data frames via a multiple input, multiple output (MIMO) communication channel, wherein the plurality of data frames are transmitted simultaneously from respective ones of a plurality of second communication devices, including receiving a respective non-legacy training field portion of a PHY preamble for each of the plurality of data frames, each non-legacy training field portion having i) a reference field, ii) a short training field, and iii) at least one long training field;
estimating, by the first communication device, a common CFO that is common to each of the plurality of data frames based on a legacy portion of the PHY preamble of each of the plurality of data frames;
compensating, by the first communication device, each of the plurality of data frames based on the common CFO;
estimating, by the first communication device, respective device-specific CFOs for channel estimation of the MIMO communication channel based on pilot tones of the corresponding reference field after compensating each of the plurality of data frames, the pilot tones having a non-overlapping allocation to the plurality of second communication devices, wherein each device-specific CFO is specific to the corresponding second communication device of the plurality of second communication devices; and
compensating, by the first communication device, the plurality of data frames based on the corresponding device-specific CFO.

14. The method of claim 13, wherein each non-legacy training field portion includes the short training field, the reference field after the short training field, and the at least one long training field after the reference field.

15. The method of claim 13, wherein each non-legacy training field portion includes the reference field, the short training field after the reference field, and the at least one long training field after the short training field.

16. The method of claim 13, wherein:
a reference OFDM symbol of the reference field is a duplicate of a first OFDM symbol of the at least one long training field; and
estimating the respective device-specific CFO comprises:
estimating a device-specific CPE between the reference OFDM symbol and the first OFDM symbol for the corresponding second communication device, and
estimating a channel matrix for the MIMO communication channel based on the device-specific CPE for the corresponding second communication device.

17. The method of claim 16, wherein the method further comprises:
determining a block allocation of tones for each antenna of the plurality of second communication devices, and
sending a synchronization frame to the plurality of second communication devices, the synchronization frame having an allocation indicator that corresponds to the determined block allocation of tones.

18. The method of claim 16, wherein the method further comprises:
determining an interleaved allocation of tones for each antenna of the plurality of second communication devices; and
sending a synchronization frame to the plurality of second communication devices, the synchronization frame having an allocation indicator that corresponds to the determined interleaved allocation of tones.

19. The method of claim 13, wherein:
the reference field comprises a CFO training field having a single OFDM symbol;
the single OFDM symbol of the CFO training field comprises a periodic subset of non-zero tones that are alternately allocated to each of the plurality of second communication devices; and
estimating the respective device-specific CFO comprises:
performing an N-point fast Fourier transform on a received signal for the single OFDM symbol to obtain a frequency domain signal, where N is an integer number of tones used for the MIMO communication channel,
nulling tones of the frequency domain signal that correspond to other devices of the plurality of second communication devices to obtain a nulled frequency domain signal,
performing an N-point inverse fast Fourier transform on the nulled frequency domain signal to obtain a time domain signal,
performing a conjugate correlation on the time domain signal to determine a device-specific CPE for the corresponding second communication device, and
determining the channel matrix based on an average of the device-specific CPEs.

20. The method of claim 13, wherein:
the reference field comprises a CFO training field having a single OFDM symbol;
the single OFDM symbol of the CFO training field comprises a periodic subset of non-zero tones that are alternately allocated to each of the plurality of second communication devices; and
estimating the respective device-specific CFO comprises:
determining a frequency domain tone value in each period of the periodic subset for the corresponding second communication device,
determining a device-specific CPE for the corresponding second communication device across each adjacent pair of periods of the periodic subset using conjugate correlation, and
determining the channel matrix based on an average of the device-specific CPEs.

21. The method of claim 13, wherein:
the reference field comprises a CFO training field having a single OFDM symbol;
the single OFDM symbol of the CFO training field comprises respective periodic time domain sequences for each of the plurality of second communication devices; and
estimating the respective device-specific CFO comprises:
determining a correlation of a received signal for the single OFDM symbol with a respective training sequence template allocated to the corresponding second communication device,
determining a device-specific CPE across each adjacent pair of periods of the periodic time domain sequence using conjugate correlation, and determining the channel matrix based on an average of the device-specific CPEs.

22. The method of claim 21, wherein an integer number of periods $N_p$ for the periodic time domain sequence is greater than an integer number of the plurality of second communication devices.

23. The method of claim 13, wherein:
the reference field comprises a CFO training field having multiple OFDM symbols;
the CFO training field comprises i) a plurality of tone blocks that are alternately allocated to each of the plurality of second communication devices, and ii) a same frequency domain training sequence on corresponding tone blocks for each of the plurality of second communication devices; and
estimating the respective device-specific CFO comprises:
performing an N-point fast Fourier transform on a received signal for each of the multiple OFDM symbols to obtain respective frequency domain signals, where N is an integer number of tones used for the MIMO communication channel,
performing a conjugate correlation on the frequency domain signals to determine a respective device-specific CPE for each of the multiple OFDM symbols for the corresponding second communication device, and
determining the channel matrix based on an average of the device-specific CPEs.

24. The method of claim 23, wherein the method further comprises:
determining a block allocation of tones for the plurality of second communication devices, and
sending a synchronization frame to the plurality of second communication devices, the synchronization frame having an allocation indicator that corresponds to the determined block allocation of tones.

25. The method of claim 23, wherein the method further comprises:
determining an interleaved allocation of tones for the plurality of second communication devices, and
sending a synchronization frame to the plurality of second communication devices, the synchronization frame having an allocation indicator that corresponds to the determined interleaved allocation of tones.

26. The method of claim 13, wherein:
the reference field comprises a CFO training field having multiple OFDM symbols;
the CFO training field of each of the plurality of data frames comprises a respective periodic time domain training sequence for the corresponding second communication device; and
estimating the respective device-specific CFO comprises:
determining a correlation of a received signal for the multiple OFDM symbols with a training sequence template allocated to the corresponding second communication device,
determining a device-specific CPE for the corresponding second communication device across each adjacent pair of periods of the periodic time domain training sequence using conjugate correlation, and
determining the channel matrix based on an average of the device-specific CPEs for the multiple OFDM symbols.

27. The method of claim 26, wherein a first periodic time domain training sequence for a first data frame of the plurality of data frames is a time shifted sequence of a second periodic time domain training sequence for a second data frame of the plurality of data frames.

* * * * *